(12) United States Patent
Lee et al.

(10) Patent No.: US 12,705,115 B2
(45) Date of Patent: Aug. 11, 2026

(54) ELECTRONIC DEVICE AND METHOD FOR CONTROLLING SIGNAL TRANSMITTED TO EXTERNAL ELECTRONIC DEVICE

(71) Applicant: SAMSUNG ELECTRONICS CO., LTD., Suwon-si (KR)

(72) Inventors: Jaehyeok Lee, Suwon-si (KR); Taikuin Mun, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 634 days.

(21) Appl. No.: 18/137,742

(22) Filed: Apr. 21, 2023

(65) Prior Publication Data

US 2024/0028427 A1 Jan. 25, 2024

Related U.S. Application Data

(63) Continuation of application No. PCT/KR2023/005004, filed on Apr. 13, 2023.

(30) Foreign Application Priority Data

Jul. 22, 2022 (KR) ........................ 10-2022-0091327
Aug. 9, 2022 (KR) ........................ 10-2022-0099558

(51) Int. Cl.
*G06F 9/44* (2018.01)
*G06F 9/54* (2006.01)
(Continued)

(52) U.S. Cl.
CPC ........ *G06F 9/542* (2013.01); *H04M 1/72409* (2021.01); *H04M 1/72463* (2021.01)

(58) Field of Classification Search
CPC ........................................................ G06F 9/542
(Continued)

(56) References Cited

U.S. PATENT DOCUMENTS 9,509,828 B2 11/2016 Lee et al.
10,554,745 B2 2/2020 Yang et al.
(Continued)

FOREIGN PATENT DOCUMENTS

CN 108037865 A 5/2018
EP 2947540 B1 9/2017
(Continued)

OTHER PUBLICATIONS

The extended European search report for EP Application No. 23843118.3 mailed on Apr. 23, 2025.
(Continued)

*Primary Examiner* — Timothy A Mudrick
(74) *Attorney, Agent, or Firm* — CANTOR COLBURN LLP

(57) ABSTRACT

An electronic device includes a display, a communication circuit, a memory, and a processor. The processor identifies, based on executing a first application for controlling an external electronic device, a second application being ceased at least temporarily displaying of a notification message by the external electronic device. The processor identifies an event for transmitting a notification message generated by the second application to the external electronic device by bypassing the first application. The processor transmits information for being ceased at least temporarily displaying of a notification message related to the event, by the external electronic device, to external electronic device, based on identifying the event, in a state of displaying a user interface for interacting with a user in the display.

20 Claims, 13 Drawing Sheets

(51) Int. Cl.
*H04M 1/72409* (2021.01)
*H04M 1/72463* (2021.01)

(58) Field of Classification Search
USPC .......................................................... 719/318
See application file for complete search history.

(56) References Cited

U.S. PATENT DOCUMENTS

| | | | |
|---|---|---|---|
| 10,824,448 B2 | 11/2020 | Kirisken | |
| 10,992,489 B2 | 4/2021 | Lee et al. | |
| 11,119,836 B2 | 9/2021 | Breaux et al. | |
| 2013/0038437 A1 | 2/2013 | Talati et al. | |
| 2013/0244576 A1 | 9/2013 | Morohoshi | |
| 2015/0341900 A1* | 11/2015 | Jeong .................... | H04W 68/02 455/458 |
| 2016/0142407 A1 | 5/2016 | Chun et al. | |
| 2017/0279966 A1 | 9/2017 | Lazaridis et al. | |
| 2020/0052922 A1* | 2/2020 | Lee ..................... | H04L 12/2823 |

FOREIGN PATENT DOCUMENTS

| | | | |
|---|---|---|---|
| JP | 2002084575 | A | 3/2002 |
| JP | 6400715 | B2 | 10/2018 |
| JP | 2020166507 | A | 10/2020 |
| JP | 7270436 | B2 | 4/2023 |
| KR | 20030088928 | A | 11/2003 |
| KR | 100837302 | B1 | 6/2008 |
| KR | 1020140023160 | A | 2/2014 |
| KR | 20160092363 | A | 8/2016 |
| KR | 20200017245 | A | 2/2020 |
| KR | 102187244 | B1 | 12/2020 |
| KR | 20210129575 | A | 10/2021 |
| KR | 102354326 | B1 | 1/2022 |
| KR | 102362690 | B1 | 2/2022 |
| KR | 20220027586 | A | 3/2022 |

OTHER PUBLICATIONS

International Search Report and Written Opinion mailed Jul. 28, 2023 for PCT/KR2023/005004.

* cited by examiner

ELECTRONIC DEVICE AND METHOD FOR CONTROLLING SIGNAL TRANSMITTED TO EXTERNAL ELECTRONIC DEVICE

CROSS-REFERENCE TO RELATED APPLICATION(S)

This application is a continuation application, claiming priority under § 365(c), of an International application No. PCT/KR2023/005004, filed on Apr. 13, 2023, which is based on and claims the benefit of a Korean patent application number 10-2022-0099558, filed on Aug. 9, 2022, and claims priority to Korean Patent Application No. 10-2022-0091327, filed on Jul. 22, 2022, in the Korean Intellectual Property Office, the disclosure of which is incorporated by reference herein in its entirety.

TECHNICAL FIELD

Various embodiments relate to an electronic device and a method for controlling a signal transmitted to an external electronic device.

BACKGROUND ART

An electronic device such as a smartphone, a tablet personal computer (tablet PC), and/or a smart watch may receive a notification message from an external object based on at least one of a plurality of applications. For example, the electronic device may provide the received notification message to a user through a display.

DISCLOSURE

Technical Solution

The electronic device according to an embodiment may comprise a display, a communication circuit, a memory, and a processor. The processor may identify based on executing a first application for controlling an external electronic device, a second application being ceased at least temporarily displaying of a notification message by the external electronic device. The processor may identify an event for transmitting a notification message generated by the second application to the external electronic device by bypassing the first application. The processor may transmit information for being ceased at least temporarily displaying of a notification message related to the event, by the external electronic device, to external electronic device, based on identifying the event, in a state of displaying a user interface for interacting with a user in the display.

A method of the electronic device according to an embodiment may comprise receiving information indicating a notification message and a state of the external electronic device from an external electronic device. The method of the electronic device may comprise refraining from displaying a visual object based on the notification message, in a display, based on identifying a first state as the state indicating that a user interface for interaction between the external electronic device and a user is displayed by the external electronic device, based on the received information. The method of the electronic device may comprise displaying the visual object, in the display, based on identifying a second state different from the first state, based on the received information.

The electronic device according to an embodiment may include a communication circuit, a memory, a display, and a processor. The processor may receive a notification message and information indicating a state of the external electronic device from an external electronic device. The processor, based on the received information, may refrain from displaying a visual object based on the notification message in the display based on identifying the state, which is a first state indicating that the external electronic device and the user interface for interaction between the user are displayed by the external electronic device. The processor may display the visual object in the display based on identifying the state, which is a second state different from the first state, based on the received information.

According to an embodiment, the method of the electronic device may comprise identifying, based on executing a first application for controlling an external electronic device, a second application being ceased at least temporarily displaying of a notification message by the external electronic device. The method of the electronic device may comprise identifying an event for transmitting a notification message generated by the second application to the external electronic device, and by bypassing the first application. The method of the electronic device may comprise transmitting, to the external electronic device, information for being ceased at least temporarily displaying of a notification message related to the event by the external electronic device, based on identifying the event, in a state of displaying a user interface for interacting with a user in a display.

A method of an electronic device according to an embodiment may comprises identifying, based on executing a first application for controlling an external electronic device, a second application being ceased at least temporarily displaying of a notification message by the external electronic device. The method may comprise identifying an event for transmitting a notification message generated by the second application to the external electronic device, in which a third application having a package name of the second application is installed, by bypassing the first application. The method may comprise being ceased at least temporarily transmitting a signal related to the event to the external electronic device based on the execution of the first application based on identifying the event.

MODE FOR INVENTION

Figure 1:
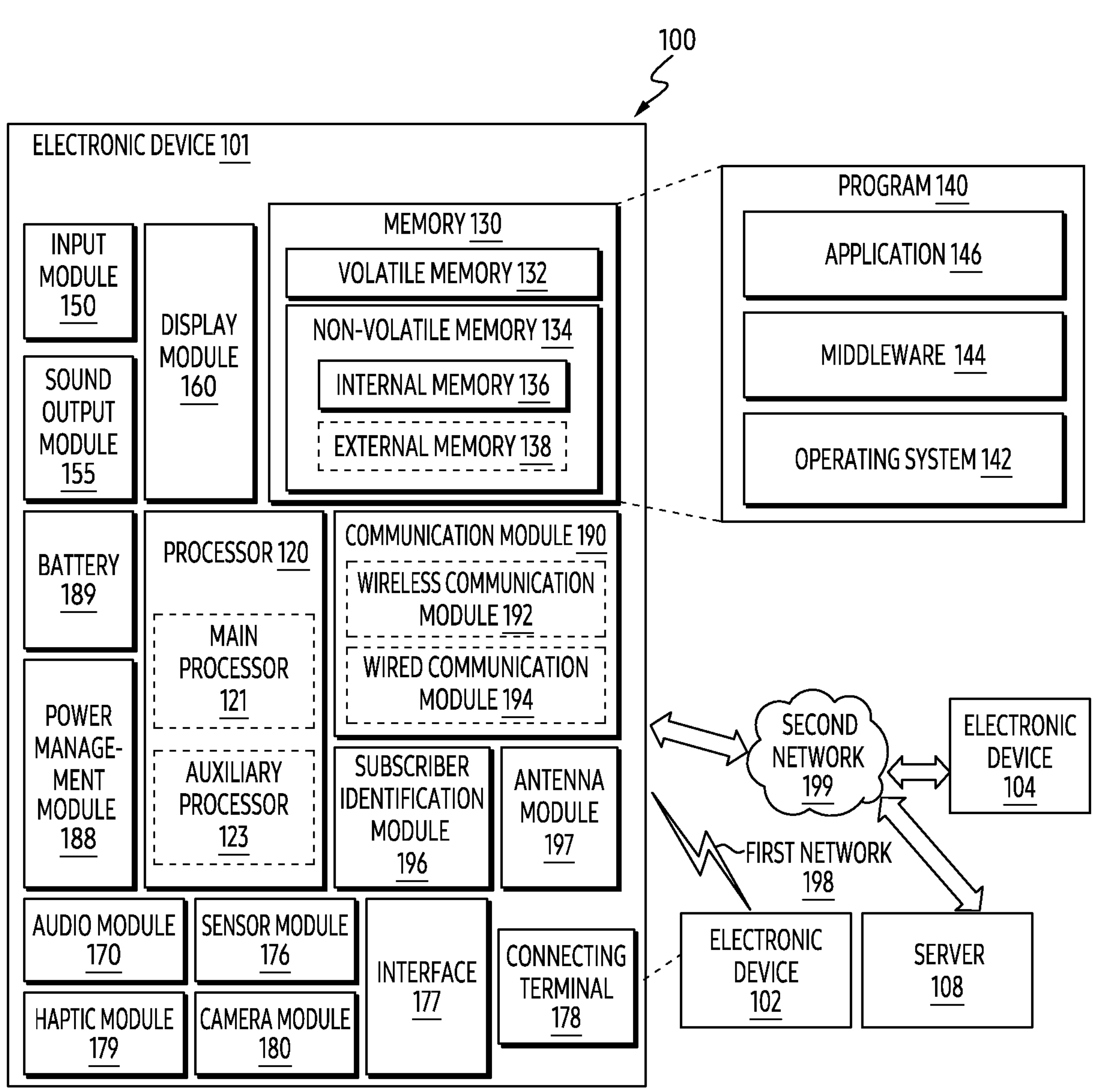
FIG. 1 is an exemplary block diagram of an electronic device in a network environment according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the present disclosure will be described with reference to the accompanying drawings.

FIG. 1 is a block diagram illustrating an electronic device 101 in a network environment 100 according to various embodiments. Referring to FIG. 1, an embodiment of the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of (or at least one selected from) the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as (or integrated into) a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. In an embodiment, for example, where the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth®, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, in a state where the electronic device 101 performs a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments disclosed in the present disclosure may be various types of devices. The electronic device may include, for example, a portable communication device (e.g., a smartphone), a computer device, a portable multimedia device, a portable medical device, a camera, a wearable device, or a home appliance. The electronic device according to an embodiment of the present disclosure is not limited to the above-described devices.

The various embodiments and terms used herein are not intended to limit the technical features described herein to specific embodiments and should be understood to include various modifications, equivalents, or substitutes of the embodiment. With respect to the description of the drawings, similar reference numerals may be used for similar or related components. The singular form of the noun corresponding to the item may include one or more of the items unless clearly indicated differently in a related context. In this disclosure, each of the phrases such as "A or B", "at least one of A and B", "at least one of A, B and C", "at least one of A, B, or C", and "at least one selected from A, B, and C" may include any one of the phrases together, or all possible combinations thereof. Terms such as "first", "second", or "second", or "second" may be used simply to distinguish a corresponding component from another corresponding component, and are not limited to other aspects (e.g., importance or order). When some (e.g., the first) component is referred to as "coupled" or "connected" in another (e.g., the second) component, with or without the term "functional" or "communicatively", it means that some of the components can be connected directly (e.g., wired), wirelessly, or through a third component.

The term "module" used in various embodiments of the present disclosure may include a unit implemented in hardware, software, or firmware and be used interchangeably with terms such as logic, logic block, component, or circuitry, for example. The module may be a minimum unit or a part of the integrally configured component or the component that performs one or more functions. For example, according to an embodiment, the module may be implemented in the form of an application-specific integrated circuit (ASIC).

Various embodiments of the present disclosure may be implemented as software (e.g., a program) including one or more instructions stored in a storage medium (or external memory) readable by a device (e.g., wearable device 100). For example, a processor (e.g., a processor) of a device (e.g., wearable device 100) may call and execute at least one of the one or more instructions stored from a storage medium. This makes it possible for the device to operate to perform at least one function according to at least one command called. The one or more instructions may include code generated by a compiler or code that may be executed by an interpreter. The device-readable storage medium may be provided in the form of a non-transitory storage medium. Here, the term 'non-transitory' only means that a storage medium is a device that is tangible and does not include a signal (e.g., electromagnetic wave), and the term does not distinguish between a case where data is semi-permanently stored and a case where it is temporarily stored.

According to an embodiment, a method according to various embodiments disclosed in the present disclosure may be provided by being included in a computer program product. The computer program products may be traded between sellers and buyers as products. The computer program products may be distributed in the form of device-readable storage media (e.g., compact disc read only memory (CD-ROM), or distributed (e.g., downloaded or uploaded) directly or online through an application store (e.g., Play Store™) or between two user devices (e.g., smartphones). In the case of online distribution, at least some of the computer program products may be temporarily stored or temporarily created on a device-readable storage medium such as a manufacturer's server, a server in an application store, or a memory in a relay server.

According to various embodiments, each of the above-described components (e.g., a module or a program) may include a single object or a plurality of objects, and some of the plurality of objects may be separated and disposed in other components. According to various embodiments, one or more components or operations of the above-described corresponding components may be omitted, or one or more other components or operations may be added. Alternatively, or additionally, a plurality of components (e.g., modules or programs) may be integrated into one component. In this case, the integrated component may perform one or more functions of each of the components in the same or similar manner as those performed by the corresponding component among the plurality of components before the integration. According to various embodiments, operations performed by a module, a program, or other components may be executed sequentially, in parallel, repeatedly, or heuristic, performed in a different order, omitted, or one or more other operations may be added.

Figure 2:
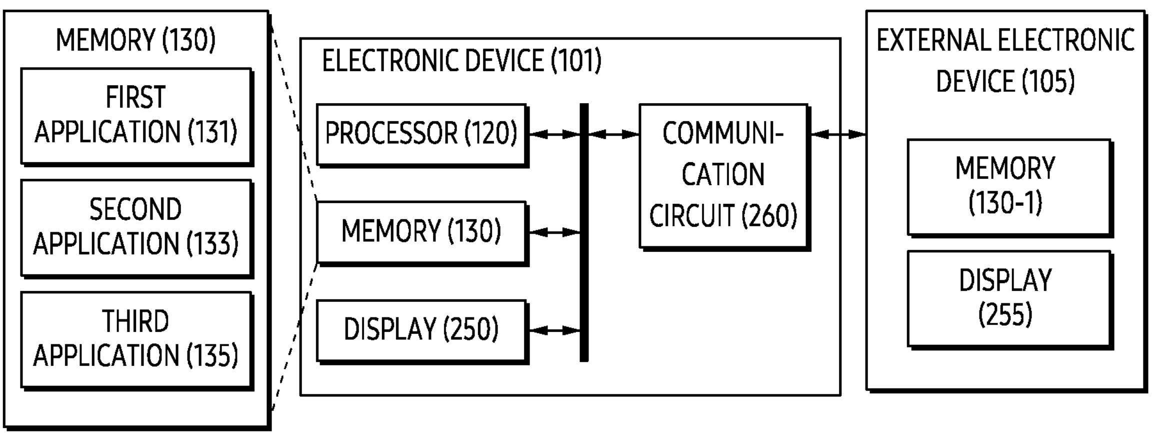
FIG. 2 illustrates an example of a block diagram of an electronic device according to an embodiment.

FIG. 2 illustrates an example of a block diagram of an electronic device according to an embodiment. For example, an electronic device 101 may correspond to the electronic device 101 of FIG. 1. For example, a processor 120 may correspond to the processor 120 of FIG. 1. For example, memories 130 and 130-1 may correspond to the memory 130 of FIG. 1. The electronic device 101 of FIG. 2 may be a terminal. The terminal may include, for example, a personal computer (PC) such as a laptop and a desktop, a smartphone, a smartpad, and/or a tablet PC. In an embodiment, an external electronic device 105 may include a smart accessory such as a smartwatch and/or a head-mounted device (HMD). For example, the external electronic device 105 may correspond to the electronic device 102 of FIG. 1.

Referring to FIG. 2, the electronic device 101 according to an embodiment may include at least one of the processor 120, the memory 130, the display 250, and the communication circuit 260. The processor 120, the memory 130, the display 250, and the communication circuit 260 may be electronically and/or operably coupled with each other by an electronic component such as a communication bus. The type and/or number of hardware components included in the electronic device 101 are not limited to those illustrated in FIG. 2. For example, the electronic device 101 may include only some of the hardware components illustrated in FIG. 2. The external electronic device 105 according to an embodiment may include one of the memory 130-1 or a display 255. For example, the type and/or number of the hardware components included in the external electronic device 105 is not limited to those illustrated in FIG. 2.

The processor 120 of the electronic device 101 according to an embodiment may include the hardware components for processing data based on one or more instructions. The hardware components for processing data may include, for example, an arithmetic and logic unit (ALU), a field programmable gate array (FPGA), and/or a central processing unit (CPU). The number of processors 120 may be one or more. For example, the processor 120 may have a structure of a multi-core processor such as a dual core, a quad core, or a hexa core.

The memories 130 and 130-1 according to an embodiment may include the hardware components for storing data and/or instructions inputted and/or outputted to the processor 120. The memories 130 and 130-1 may include, for example, volatile memory such as random-access memory (RAM) and/or non-volatile memory such as read-only memory (ROM). The volatile memory may include, for example, at least one of dynamic RAM (DRAM), static RAM (SRAM), Cache RAM, and pseudo SRAM (PSRAM). The non-volatile memory may include, for example, at least one of programmable ROM (PROM), erasable PROM (EPROM), electrically erasable PROM (EEPROM), flash memory, hard disk, compact disk, and embedded multi media card (eMMC).

The one or more instructions indicating an operation to be performed by the processor 120 may be stored in the memory 130 of the electronic device 101 according to an embodiment. A set of instructions may be referred to as firmware, operating system, process, routine, sub-routine and/or application. For example, the electronic device 101 and/or the processor 120 of the electronic device 101 may perform at least one of the operations of FIG. 11 or FIG. 13 by executing a set of a plurality of instructions distributed in the form of an application.

Some of the applications stored in the memory 130 of the electronic device 101 according to an embodiment are conceptually illustrated. The application may be an example of a program that performs a specific function in electronic device 101. The application may be divided into a preload application and/or a third party application. The preload application may be an example of an application stored in the electronic device 101 to use the electronic device 101. The third party application may be an example of an application installed by a user while the user of the electronic device 101 uses the electronic device 101. For example, a first application 131, a second application 133, and/or a third application 135 may be stored and/or installed in the memory 130 of the electronic device 101. Hereinafter, the fact that the application is installed in the electronic device 101 means that one or more instructions provided in the form of an application are stored in the memory 130 of the electronic device 101, and the one or more instructions are stored in an executable format (e.g., a file with an extension designated by the operating system of the electronic device 101) by the processor 120 of the electronic device 101.

The electronic device 101 according to an embodiment may control the external electronic device (e.g., the external electronic device 105 of FIG. 2) by using at least one application. For example, the electronic device 101 may store and/or install a plurality of applications in external electronic device 105 by using the first application 131. For example, the electronic device 101 may synchronize information (e.g., an application) stored in the external electronic device 105 by using the first application 131. For example, the electronic device 101 may install the second application 133 and/or the third application 135 in the external electronic device 105 by using the first application 131. In terms of supporting functions related to the external electronic device 105, the first application 131 may be referred to as a watch-plugin.

In an embodiment, the electronic device 101 and/or the external electronic device 105 may receive notification information from at least one external object (e.g., a server) by using the second application 133 and/or the third application 135. For example, the electronic device 101 may control display of the notification information received in the external electronic device 105 by using the first application 131. For example, the electronic device 101 may bypass the first application 131 and may transmit the notification information to the external electronic device 105 by using an application different from the first application 131 (e.g., the second application 133). An operation in which the electronic device 101 bypasses the first application 131 and transmits the notification information to the external electronic device 105 will be described later in greater detail with reference to FIG. 3.

The displays 250 and 255 according to an embodiment may be controlled by a controller such as a processor (e.g., the processor 120) to output visualized information to the user. The displays 250 and 255 may include a flat panel display (FPD), a flexible display, and/or an electronic paper. The FPD may include a liquid crystal display (LCD), a plasma display panel (PDP), and/or one or more light emitting diodes (LEDs). The LED may include organic LED (OLED). For example, the electronic device 101 may display a screen (or a screen image) for controlling the external electronic device 105 through the display 250 by using the first application 131. For example, the electronic device 101 may temporarily cease displaying the notification information received through the external electronic device 105 by using a plurality of visual objects included in the screen.

The communication circuit 260 of the electronic device 101 according to an embodiment may include the hardware component for supporting transmission and/or reception of a signal between the electronic device 101 and the external electronic device 105. The communication circuit 260 may include, for example, at least one of a modem (MODEM), an antenna, or an optical/electronic (O/E) converter. For example, the communication circuit 260 may support transmission and/or reception of signals based on various types of protocols such as ethernet, local area network (LAN), wide area network (WAN), wireless fidelity (WiFi), Bluetooth®, bluetooth low energy (BLE), ZigBee, long term evolution (LTE), and/or 5G new radio (NR). For example, the electronic device 101 may establish a communication link wirelessly with the external electronic device 105 by using the communication circuit 260. The electronic device 101 may transmit and/or receive data with the external electronic device 105 based on the communication link. For example, the data may include the notification information. For example, the external electronic device 105 may display the visual object based on the notification information through the display 255 by using the received data.

As described above, the electronic device 101 may control at least one external object (e.g., the external electronic device 105 of FIG. 2) by using one of the plurality of applications stored in the memory 130. For example, the electronic device 101 may receive the notification information from the external object (e.g., a server) by using the application (e.g., the second application 133 or the third application 135). The electronic device 101 may transmit the notification information to the external electronic device 105 based on at least one communication circuit (e.g., the communication circuit 260). For example, the electronic device 101 may bypass the first application 131 and may transmit the notification information to the external electronic device 105. The electronic device 101 may prevent transmission of redundant data based on bypassing the first application 131. Hereinafter, an operation of controlling transmission of notification information for some of a plurality of applications to the external electronic device 105 based on at least one screen by the electronic device 101 will be described with reference to FIG. 3.

Figure 3:
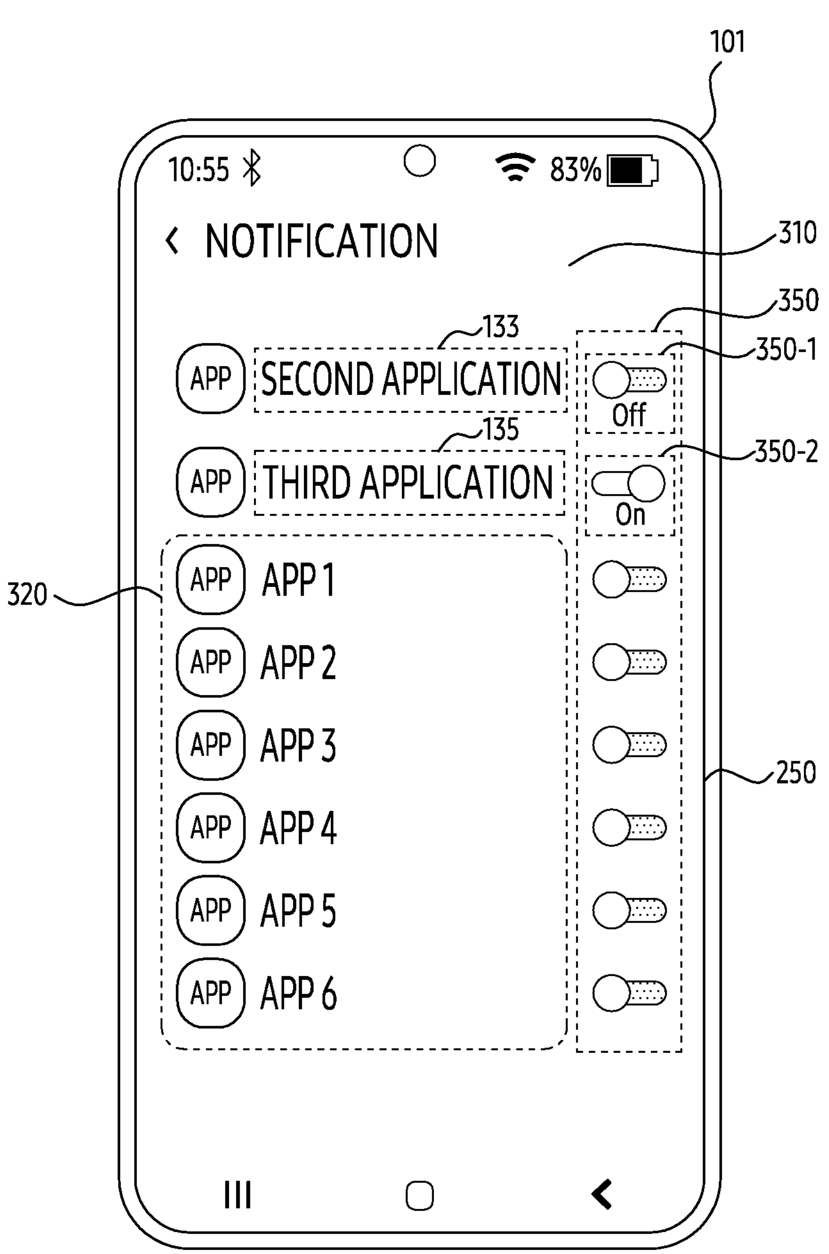
FIG. 3 illustrates an exemplary screen for controlling transmission of notification information for some of a plurality of applications according to an embodiment.

FIG. 3 illustrates an exemplary screen for controlling transmission of notification information for some of a plurality of applications according to an embodiment. Referring to FIG. 3, a screen 310 including information on a plurality of applications displayed through the display 250 of an electronic device 101 is illustrated. For example, the electronic device 101 may correspond to the electronic device 101 of FIG. 2. The display 250 may correspond to the display 250 of FIG. 2. For example, some of a second application 133, a third application 135, and/or a plurality of applications 320 may be an example of an application stored and/or installed in the electronic device 101 and/or an external electronic device (e.g., an external electronic device 105 of FIG. 2).

The electronic device 101 according to an embodiment may display at least one screen 310 based on the application (e.g., a first application 131 of FIG. 2). For example, the application may be an example of the application for controlling at least one external electronic device (e.g., the external electronic device 105 of FIG. 2). For example, the screen 310 may include information (e.g., icons) on a plurality of applications stored in a memory (e.g., a memory 130 of FIG. 2) of the electronic device 101. For example, the screen 310 may be an example of a user interface indicating whether to display a notification message by the external electronic device (e.g., the external electronic device 105 of FIG. 2). For example, the screen 310 may include a plurality of visual objects 350. For example, at least some of the plurality of applications may be installed and/or stored in the external electronic device (e.g., the external electronic device 105 of FIG. 2). For example, the electronic device 101 may receive information (e.g., package name) on the plurality of applications 320 included in the screen 310 from the external electronic device 105.

The electronic device 101 according to an embodiment may transmit the notification message (e.g., a push message and/or an alarm message) generated based on the execution of the application (e.g., the second application 133) to the external electronic device (e.g., the external electronic device 105 of FIG. 2). For example, the electronic device 101 may transmit the notification message to the external electronic device (e.g., the external electronic device 105 of FIG. 2) by using an application different from the application (e.g., the first application 131 of FIG. 2). For example, the electronic device 101 may temporarily cease transmitting the notification message to the external electronic device by using the screen 310. For example, the electronic device 101 may at least temporarily cease displaying the notification message by the external electronic device on the display (e.g., the display 255 of FIG. 2) of the external electronic device using the screen 310.

The electronic device 101 according to an embodiment may receive an input indicating whether to display the notification message based on the external electronic device by using the screen 310 displayed on the display 250. For example, the electronic device 101 may display a visual object indicating whether to temporarily cease displaying the notification message by the external electronic device (e.g., the external electronic device 105 of FIG. 2) within the screen 310. For example, the electronic device 101 may control the display of the notification message by the external electronic device based on an input related to the visual object. For example, the electronic device 101 may control the transmission of a signal for the notification message through the first application 131 by using the visual objects 350 to control the display of the notification message by the external electronic device. For example, the electronic device 101 may temporarily control the transmission of a signal for the notification message to the external electronic device 105 through the first application 131 by using the visual objects 350, independently of transmitting a signal for the notification message to the external electronic device 105 by using the second application 133. For example, within the screen 310, the electronic device 101 may display a visual object 350-1 indicating that the display of the notification message by the external electronic device is at least temporarily ceased as associated with the visual object indicating the second application 133. For example, within the screen 310, the electronic device 101 may display a visual object 350-2 indicating that the display of the notification message by the external electronic device is allowed as associated with the visual object indicating the third application 135. For example, the electronic device 101 may receive at least one notification message through the second application 133 while the visual object 350-1 is inactivated. For example, the electronic device 101 may temporarily cease transmitting the received notification message through an application (e.g., the first application 131 of FIG. 2) for controlling the external electronic device based on the inactive state of the visual object 350-1. For example, the electronic device 101 may transmit the notification message to the external electronic device using the second application 133 while temporarily ceasing transmitting the notification message through an application for controlling the external electronic device based on the inactive state of the visual object 350-1. An operation in which the electronic device 101 transmits the notification message to the external electronic device by using the second application 133 will be described later in greater detail with reference to FIG. 4.

As described above, the electronic device 101 may display the screen 310 by using the first application (e.g., the first application 131 of FIG. 2) for controlling the external electronic device (e.g., the external electronic device 105 of FIG. 2). For example, the electronic device 101 may receive the notification message through the second application (e.g., the second application 133 in FIG. 2) and/or the third application (e.g., the third application 135 in FIG. 2) different from the first application. The electronic device 101 may temporarily cease transmitting a first notification message received by using the second application to the external electronic device through the first application. The electronic device 101 may transmit the first notification message to the external electronic device by using the second application while temporarily ceasing transmitting the notification message to the external electronic device through the first application. For example, the electronic device 101 may transmit a second notification message received by using the third application (e.g., the third application 135 of FIG. 2) to the external electronic device through the first application. The electronic device 101 may prevent data transmission delay based on controlling transmission of data (e.g., the notification message) to the external electronic device by using a plurality of applications (e.g., the first application 131, the second application 133, or the third application 135 of FIG. 2).

Figure 4:
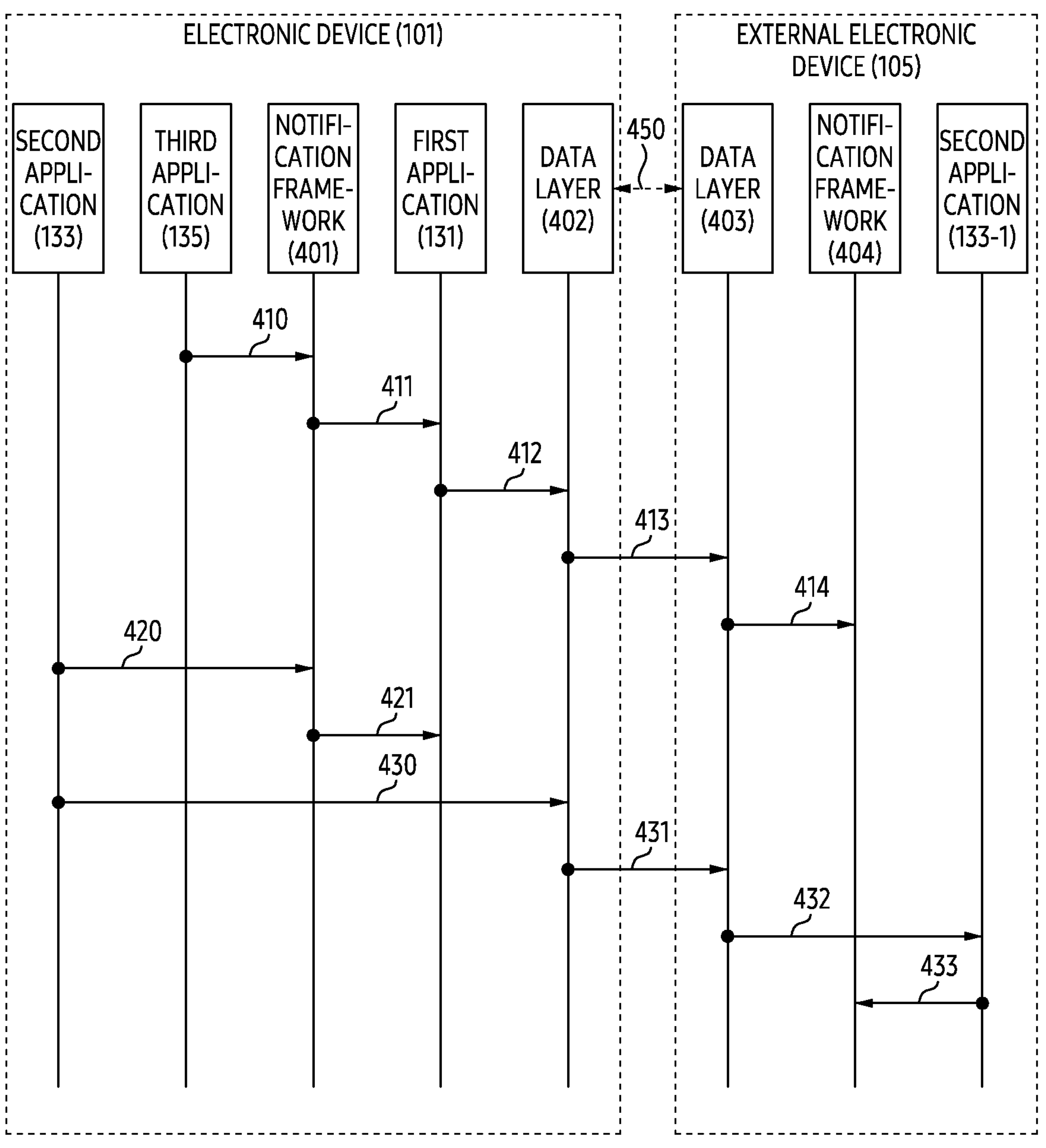
FIG. 4 illustrates an exemplary signal flowchart between an electronic device and an external electronic device according to an embodiment.

FIG. 4 illustrates an exemplary signal flowchart between an electronic device and an external electronic device according to an embodiment. Referring to FIG. 4, the electronic device 101 may correspond to the electronic device 101 of FIG. 2. The external electronic device 105 may correspond to the external electronic device 105 of FIG. 2. The first application 131 may correspond to the first application 131 of FIG. 2. The second application 133 may correspond to the second application 133 of FIG. 2. The third application 135 may correspond to the third application 135 of FIG. 2. For example, the electronic device 101 may establish a communication link (e.g., Bluetooth®) through the external electronic device 105 and at least one communication circuit (e.g., the communication circuit 260 of FIG. 2). Through the communication link, the electronic device 101 and the external electronic device 105 may transmit and/or receive at least one data.

Referring to FIG. 4, according to an embodiment, processes (e.g., a plurality of applications 131, 133, 135, notification framework 401, and data layer 402) executed by the processor (e.g., processor 120 of FIG. 2) of the electronic device 101 may be divided into different blocks. The processes may mean a unit of operations performed by the processor. The processes may be referred to as instances. Referring to FIG. 4, a function and/or a sub-routine included in one or more processes executed in the electronic device 101 according to an embodiment are divided and illustrated based on information transmitted between the function and/or sub-routine. Layers for dividing the processes based on the function and/or purpose of the processes executed by the electronic device 101 and/or the external electronic device 105 are illustrated.

The processor of the electronic device 101 and/or the external electronic device 105 according to an embodiment may support the exchange of data between the layers based on an application programming interface (API). For example, notification frameworks 401 and 404 are system services for controlling a user interface (UI) (e.g., a notification message) provided by an operating system, and may be controlled by an application (e.g., the second application 133 and 133-1) and/or an object generated based on the execution of a push service (not illustrated), and/or a class. The notification frameworks 401 and 404 may be referred to as a notification manager and/or a notification center.

For example, the electronic device 101 may transmit and/or receive a data signal with the external electronic device 105 by using the data layer 402. For example, the electronic device 101 may control an established communication link with the external electronic device 105 by using the data layer 402. For example, the electronic device 101 may establish or may release a logical connection (e.g., a socket and/or session) between the external electronic devices 105 by using the data layer 402. For example, the established communication link between the electronic device 101 and the external electronic device 105 may be distinguished by a logical connection 450 between the data layer 402 of the electronic device 101 and the data layer 403 of the external electronic device 105. For example, the exchange of data based between the data layers 402 and 403 of the electronic device 101 and the external electronic device 105 may be performed based on the logical connection 450. For example, although not illustrated, some of the layers may include processes for executing an application and/or processes (e.g., the system service) provided by the operating system to support execution of the application.

The electronic device 101 according to an embodiment may obtain port information corresponding to the external electronic device 105 while establishing at least one communication link with the external electronic device 105. For example, the port information may be an example of a logical unit for identifying a network service or process (e.g., an application). For example, the port information may include a port number corresponding to each of a plurality of applications stored in the external electronic device 105. For example, the electronic device 101 may receive at least one notification information by using an application synchronized with the external electronic device 105 (e.g., the second application 133). For example, the electronic device 101 may transmit the received notification information to the external electronic device 105 by using data (or signal) including the port information about the second application 133-1 stored in the external electronic device 105. For example, the external electronic device 105 may identify the received data as data for the second application 133-1, based on the port information.

The electronic device 101 according to an embodiment may temporarily cease transmitting at least one data to the external electronic device 105 by using the first application 131. For example, the electronic device 101 may receive at least one notification information from an external object (e.g., a server) by using the second application 133 and/or the third application 135. For example, the second application 133 may be an example of an application set so that the electronic device 101 temporarily ceases displaying a visual object based on the notification information by the external electronic device 105 based on the screen 310 of FIG. 3. For example, the third application 135 may be an example of an application set so that the electronic device 101 allows display of the visual object based on the notification information by the external electronic device 105 by using the first application 131. For example, the electronic device 101 may identify package names of a plurality of applications (e.g., the second application 133 or the third application 135) stored in the electronic device and may allow display of the visual object.

For example, the package name may be text uniquely assigned to an application. The package name may be stored in a file included in an application such as a manifest (e.g., androidmanifest.xml). The package name may be identified by an operating system (OS) stored in a memory of the electronic device 101 (e.g., the memory 130 of FIG. 2). For example, the package name of the second application 133 stored in the electronic device 101 may be the same as the package name of the second application 133-1 stored in the external electronic device 105.

For example, the electronic device 101 may map the second application 133 and the second application 133-1. For example, the electronic device 101 may receive information (e.g., the package name) on a plurality of applications (e.g., a plurality of applications 320 of FIG. 3) installed in the external electronic device 105, from the external electronic device 105. For example, based on the information, the electronic device 101 may map information (e.g., the package name) of applications stored in the electronic device 101, respectively. For example, the electronic device 101 may identify information (e.g., “app.example.factoryt1”) on the second application 133-1 based on at least one data (e.g., list of the plurality of applications 320 of FIG. 3) received from the external electronic device 105. For example, based on the identified information, the electronic device 101 may identify information (e.g., “<meta-data android: name=“com.google.android.wearable.companion.pacakge”; android:value=“app.examplefactory2”/>”) on the second application 133 installed in the electronic device 101. For example, based on the identified information, the electronic device 101 may identify the second application 133-1 and the second application 133 as applications including similar information.

Hereinafter, it is assumed that the electronic device 101 receives an input for transmitting the notification message (or the notification information) generated by the third application 135 to the external electronic device 105 based on the execution of the first application 131. The input may include an input for activating the visual object 350-2 of FIG. 3 displayed in association with the visual object for the third application 135 of FIG. 3.

The electronic device 101 according to an embodiment may identify an event generated by the third application 135 and for transmitting the notification information (or the notification message) to the external electronic device 105. Based on identifying the event, the electronic device 101 may transmit the notification information to the external electronic device 105 based on the first application 131. For example, the electronic device 101 may obtain data 410 processed by the notification framework 401 based on the execution of the third application 135. For example, the data 410 may include the notification information identified by the electronic device 101 based on the execution of the third application 135. The electronic device 101 may identify the notification information and/or the data 410 included in the notification information by using the notification framework 401. For example, the electronic device 101 may manage and/or process data 411 generated from the data 410 identified based on the execution of the notification framework 401 by using the first application 131. For example, the electronic device 101 may provide the data 412 generated from the data 411 identified based on the execution of the first application 131 for the data layer 402 to process. For example, the electronic device 101 may transmit a generated data signal 413 to the external electronic device 105 based on the data 412 by using the data layer 402. The external electronic device 105 may obtain data 414 processed by the notification framework 404 from the data signal 413 received from the electronic device 101 based on the execution of the data layer 403. For example, the data 414 may include the notification information. For example, the external electronic device 105 may display a screen including the visual object for the notification information through a display (e.g., a display 255 of FIG. 2) based on the data 414.

Hereinafter, it is assumed that the electronic device 101 transmits the notification message (or the notification information) generated by the second application 133 to the external electronic device 105 based on the execution of the first application 131 or receives an input for ceasing displaying the notification message through the external electronic device 105. The input may include an input for inactivating the visual object 350-1 displayed in association with the visual object for the second application 133 within the screen 310 of FIG. 3.

The electronic device 101 according to an embodiment may receive the notification information by using the second application 133. For example, the electronic device 101 may provide the data 420 generated by the second application 133 to the notification framework 401 for processing. For example, the electronic device 101 may generate manageable data 421 by the first application 131 based on the execution of the notification framework 401. For example, the data 421 may include information on the data 420 generated by the second application 133. For example, the electronic device 101 may identify information on the second application 133 by using the first application 131. For example, based on identifying the information, the electronic device 101 may temporarily cease generating data different from the data processed by the data layer 402 by using the first application 131.

The electronic device 101 according to an embodiment may transmit the notification information to the external electronic device 105 independently of execution of the first application 131. For example, the electronic device 101 may identify data 430 to be transmitted to the external electronic device 105 through the data layer 402 independently of the first application 133 based on the execution of the second application 133. For example, the data 430 may include the notification information generated by the second application 133. For example, the electronic device 101 may transmit a data signal 431 generated based on the data 430 to the external electronic device 105 by using the data layer 402. For example, the data signal 431 may include a port number for the second application 133-1 stored in the external electronic device 105.

The external electronic device 105 according to an embodiment may obtain controllable data 432 by the second application 133-1 by using the data layer 403 based on the received data signal 431. For example, the external electronic device 105 may generate data 433 processed by the notification framework 404 by using the second application 133-1. For example, the external electronic device 105 may display at least one screen through the display (e.g., the display 255 of FIG. 2) by using the notification framework 404 based on the generated data 433. For example, the at least one screen may include the visual object for the notification information generated by the second application 133 stored in the electronic device 101 and transmitted to the external electronic device 105 by bypassing the first application 131 stored in the electronic device 101. For example, the visual object for the notification information may include text information. For example, the at least one screen may be an example of a screen provided by the external electronic device 105 through the display (e.g., the display 255 of FIG. 2) by using the second application 133-1. For example, the at least one screen may include the same information as the screen provided by the electronic device 101 through the display of the electronic device 101 by using the second application 133. For example, the screen provided through the display of the electronic device 101 may include an image and/or deep link information. For example, the at least one screen may be an example of a screen that has changed the location and/or size of at least some of the visual objects included in the screen provided through the display of the electronic device 101 to be displayed by using the display (e.g., the display 255 of FIG. 2). For example, the external electronic device 105 may include information for guiding the verification of the notification information based on the electronic device 101 in the at least one screen.

In an embodiment, as described above, the electronic device 101 may control the transmission of a data signal including the notification information to the external electronic device 105 through the first application 131 based on the information of the application (e.g., the second application 133) stored in the electronic device 101. For example, in a case where the electronic device 101 transmits the data signal including the notification information generated by the second application 133 to the external electronic device 105 through the first application 131, the electronic device 101 may bypass the first application 131 and may transmit the different data signal, which is different from the data signal transmitted to the external electronic device 105 through the first application 131, to the external electronic device 105. For example, the data signal and the different data signal may include substantially the same notification information as each other. The electronic device 101 may temporarily cease generating the data signal transmitted to the external electronic device 105 by using the first application 131 to prevent transmitting the redundant data signal including the same notification information to the external electronic device 105.

Figure 5:
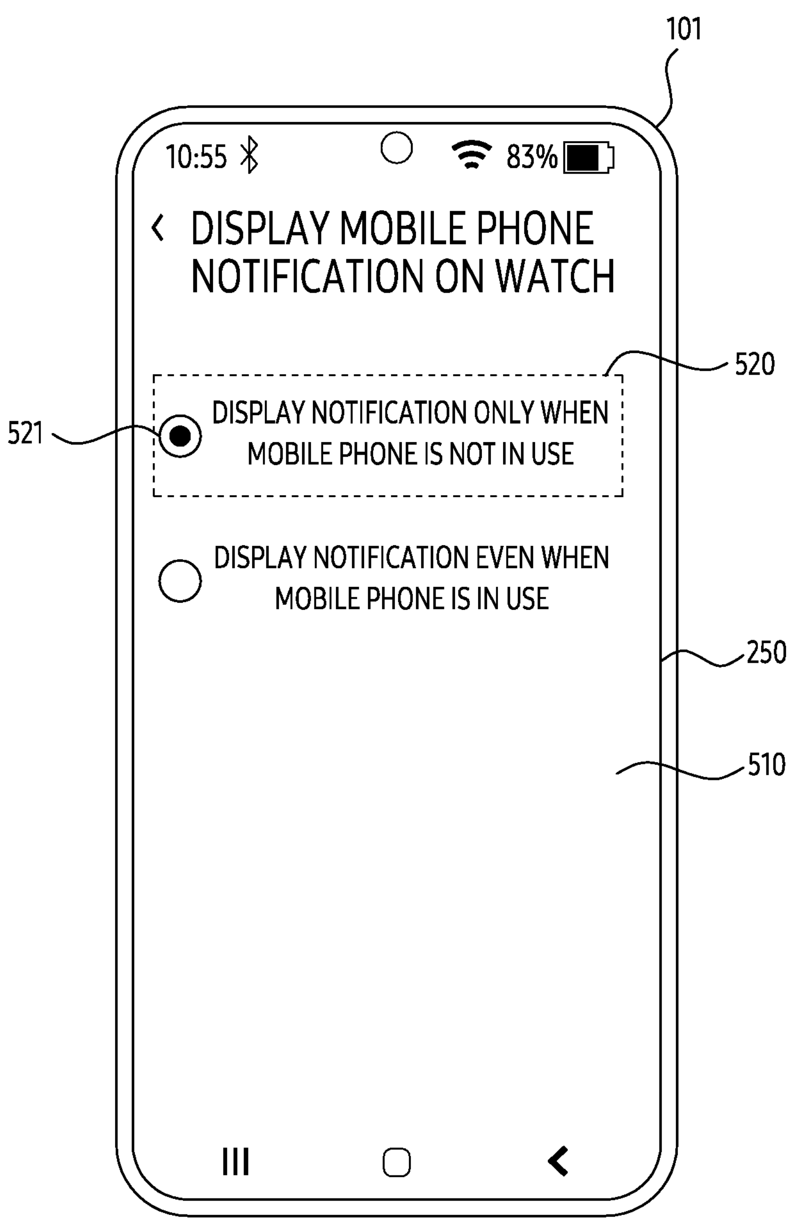
FIG. 5 illustrates an exemplary screen for controlling display of a notification message according to an embodiment.

FIG. 5 illustrates an exemplary screen for controlling display of a notification message according to an embodiment. Referring to FIG. 5, the electronic device 101 may correspond to the electronic device 101 of FIG. 2. A display 250 may correspond to the display 250 of FIG. 2. For example, referring to FIG. 5, the electronic device 101 may display a screen 510 on the display 250 based on an application (e.g., a first application 131 of FIG. 2) for controlling an external electronic device (e.g., an external electronic device 105 of FIG. 2). For example, the screen 510 may include information on a state in which the electronic device 101 displays a user interface for interacting with a user.

Referring to FIG. 5, the electronic device 101 may display the screen 510 based on the application (e.g., the first application 131 of FIG. 2). For example, the electronic device 101 may receive an input for controlling the display of a visual object for notification information by the external electronic device (e.g., the external electronic device 105 of FIG. 2) by using the screen 510. For example, the screen 510 may include a visual object 520 indicating an indication thereof for the notification information by using the external electronic device in a state different from that of displaying the user interface for interaction between electronic device 101 and the user. For example, the state of displaying the user interface may correspond to a state in which a processor (e.g., a processor 120 of FIG. 2) of the electronic device 101 receives power exceeding a designated threshold (e.g., an active state). For example, the state different from the state of displaying the user interface may correspond to a state in which the processor receives power less than the designated threshold (e.g., a sleep state). In the sleep state, the electronic device 101 may inactivate the display or display a designated screen that may be displayed independently of execution of a processor on the display based on an always-on-display (AOD) function. For example, the electronic device 101 may transmit information on the state (e.g., the active state or the sleep state) to the external electronic device. The timing at which the electronic device 101 transmits information on the state to the external electronic device (e.g., the external electronic device 105 of FIG. 2) will be described later in greater detail with reference to FIGS. 7 to 10.

The electronic device 101 according to an embodiment may receive an input indicating selection of the visual object 520 from the user of the electronic device 101. The electronic device 101 may display the visual object 521 in association with the visual object 520 based on receiving the input. Based on the display of the visual object 521, the electronic device 101 may request the external electronic device to temporarily cease displaying the visual object for at least one notification information in a state in which the processor of the electronic device 101 receives power exceeding the designated threshold. For example, although not illustrated, the electronic device 101 may receive an input indicating selection of the visual object indicating a state (e.g., the sleep state) different from that corresponding to the visual object 520. Based on the electronic device 101 receiving the input, in the state of displaying the UI indicating the interaction between the electronic device and the user, the external electronic device may display the visual object (e.g., a screen including the notification information) for the at least one notification information independently of the state. The electronic device 101 may transmit information indicating that a state corresponding to the visual object 520 is activated to the external electronic device (e.g., the external electronic device 105 of FIG. 2). An operation in which the electronic device 101 transmits the information will be described later in greater detail with reference to FIG. 6.

In an embodiment, as described above, the electronic device 101 may transmit information on the state of the electronic device 101 to the external electronic device independently of transmitting and/or receiving the information and/or the notification information on the application stored in the external electronic device (e.g., the external electronic device 105 of FIG. 2) to and from the external electronic device. The external electronic device may identify the state of the electronic device 101 based on receiving the information. The external electronic device may control the display of the screen for the notification information received from the electronic device 101 based on identifying the state. The electronic device 101 may control the display of redundant (or repetitive) notification information based on requesting to temporarily cease displaying the screen for notification information to the external electronic device. The electronic device 101 may prevent an increase in the amount of data usage of the electronic device 101 based on controlling the display of the redundant notification information.

Figure 6:
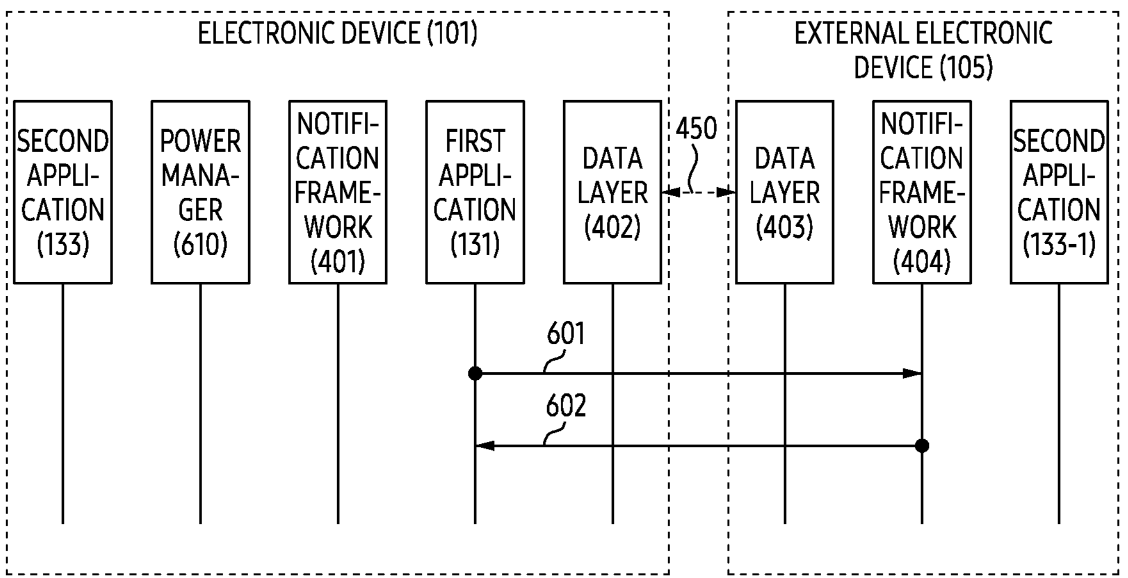
FIG. 6 illustrates an exemplary signal flowchart between an electronic device and an external electronic device for transmitting and receiving information for controlling display of information and a notification message for some of a plurality of applications according to an embodiment.

FIG. 6 illustrates an exemplary signal flowchart between an electronic device and an external electronic device for transmitting and receiving information for controlling display of information and a notification message for some of a plurality of applications according to an embodiment. Referring to FIG. 6, an electronic device 101 may correspond to the electronic device 101 of FIG. 2. An external electronic device 105 may correspond to the external electronic device 105 of FIG. 2. A first application 131 may correspond to the first application 131 of FIG. 2. A second application 133 may correspond to the second application 133 of FIG. 2. Notification frameworks 401 and 404 may correspond to the notification framework 401 and 404 of FIG. 4. Data layers 402 and 403 may correspond to the data layers 402 and 403 of FIG. 4. Logical connection 450 may correspond to the logical connection 450 of FIG. 4.

Referring to FIG. 6, the electronic device 101 according to an embodiment may identify a state of the electronic device 101 among an active state or a sleep state based on the power manager 610. For example, the electronic device 101 may obtain first information (or data) processed by the first application 131 based on the execution of the power manager 610 in the active state. For example, the first information may include information indicating that the electronic device 101 is included in the active state. For example, the electronic device 101 may obtain second information (or data) processed by the first application 131 based on the execution of the power manager 610 in the sleep state. For example, the second information may include information indicating that the electronic device 101 is in the sleep state. For example, the electronic device 101 may store a parameter for one of the first information or second information obtained based on the state (e.g., the active state or the sleep state) of the electronic device 101 in at least a part of the memory (e.g., a memory 130 in FIG. 2) corresponding to the first application 131. For example, the electronic device 101 may transmit information on the state of the electronic device 101 and/or the state of the display to the external electronic device 105 based on the parameter. The timing at which the electronic device 101 transmits the information will be described later in greater detail with reference to FIGS. 7 to 10.

Referring to FIG. 6, the electronic device 101 according to an embodiment may transmit data indicating whether to display a visual object for notification information by the external electronic device 105 in a specific state (e.g., the active state or the sleep state) of the electronic device 101 to the external electronic device 105, based on the first application 131. For example, the electronic device 101 may control the display of the visual object by the external electronic device 105 by using a screen (e.g., a screen 510 of FIG. 5) based on the first application 131. For example, the electronic device 101 may transmit a data signal 601 indicating that information corresponding to the visual object (e.g., the visual object 520 of FIG. 5) included in the screen 510 of FIG. 5 is activated to the external electronic device 105. For example, the data signal 601 may include data processed by the data layer 402 based on the execution of the first application 131.

The external electronic device 105 according to an embodiment may obtain data processed by the notification framework 404 from the data signal 601 received from the electronic device 101 based on the execution of the data layer 403. Based on the obtained data, the external electronic device 105 may identify whether to display the visual object for at least one notification information according to the specific state (e.g., the active state or the sleep state) of the electronic device 101. For example, the external electronic device 105 may store parameters based on the obtained data in the memory (e.g., a memory 130-1 of FIG. 2) corresponding to the notification framework 404. Based on the notification information generated by at least one application (e.g., the second application 133) stored in the electronic device 101, and the parameter, the operation of adjusting the display of the visual object for the notification information by the external electronic device 105 will be described later in greater detail with reference to FIGS. 7 to 10.

The external electronic device 105 according to an embodiment may transmit the data signal 602 to the electronic device 101 independently of receiving the data signal 601 from the electronic device 101. The data signal 602 may include information on a plurality of applications stored in the external electronic device 105. For example, the information may include a package name of each of a plurality of applications. For example, the plurality of applications may include the second application 133-1. The second application 133-1 may be an example of an application in which the electronic device 101 is set to temporarily cease transmitting notification information through the first application 131. For example, the second application 133 stored in the electronic device 101 and the second application 133-1 stored in the external electronic device 105 may be synchronized with each other based on the communication link established between the electronic device 101 and the external electronic device 105. For example, based on the synchronization, the second application 133-1 may include substantially the same information as the second application 133. For example, based on the communication link, the electronic device 101 may transmit data on the received notification information to the external electronic device 105 to synchronize the data with the second application 133-1 stored in the external electronic device 105 by using the second application 133.

The electronic device 101 according to an embodiment may obtain data processed by the first application 131 based on receiving the data signal 602 from the external electronic device 105. For example, the electronic device 101 may display at least one screen based on the data by using the first application 131. The screen may include visual objects corresponding to a plurality of applications stored in external electronic device 105. For example, the screen may correspond to the screen 310 of FIG. 3. The electronic device 101 may control the display of a visual object for the received notification information based on each of the plurality of applications by the external electronic device 105 based on the screen. For example, the electronic device 101 may temporarily refrain from (or cease) transmitting the notification information generated by the second application 133 to the external electronic device 105 by using the first application 131. For example, the electronic device 101 may transmit the notification information generated by a third application (e.g., a third application 135 of FIG. 2) to the external electronic device 105 by using the first application 131.

In an embodiment, as described above, the electronic device 101 may exchange data with the external electronic device 105 while establishing at least one communication link with the external electronic device 105. For example, based on some of a plurality of applications, independently of transmitting data on notification information to external electronic device 105, the electronic device 101 may transmit information indicating whether the visual object is displayed on the notification information by using external electronic device 105 based on the state (e.g., the active state or the sleep state) to electronic device 101. For example, the external electronic device 105 may temporarily cease displaying the visual object for the notification information while the user uses the electronic device 101 based on the received information. For example, the user of the electronic device 101 may identify the received notification information based on the electronic device 101 and one application stored in the external electronic device 105 by using either the electronic device 101 or the external electronic device 105.

Hereinafter, independently of transmitting data on notification information obtained by using the application to the external electronic device 105, transmitting information indicating the state of the electronic device 101 (e.g., the active state or the sleep state) to the external electronic device 105 will be described with reference to FIGS. 7 to 10.

Figure 7:
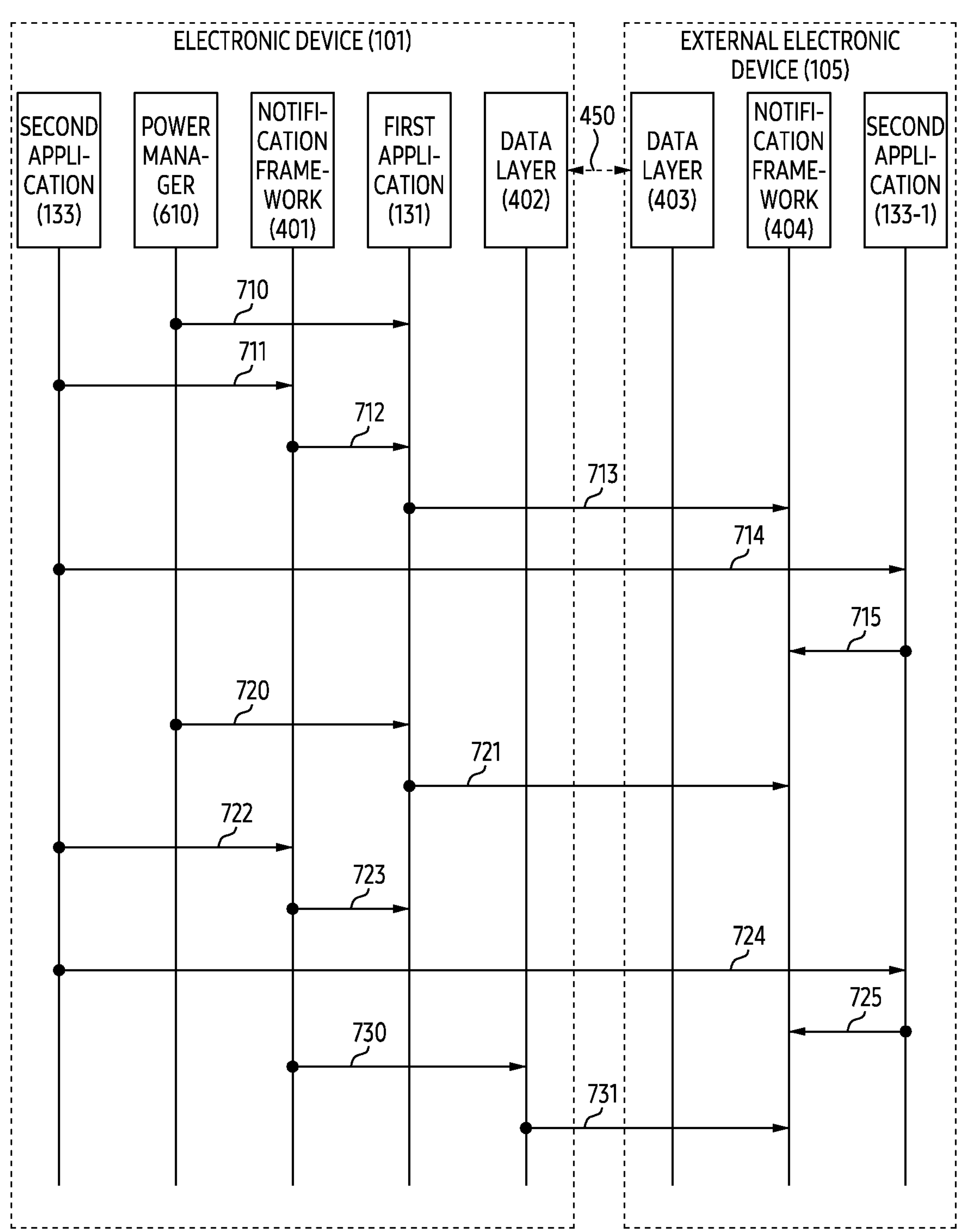
FIG. 7 illustrates an exemplary signal flowchart between an electronic device and an external electronic device according to a timing at which the electronic device transmits information for controlling display of a notification message according to an embodiment.

FIG. 7 illustrates an exemplary signal flowchart between an electronic device and an external electronic device according to a timing at which the electronic device transmits information for controlling display of a notification message according to an embodiment. An electronic device 101 may correspond to the electronic device 101 of FIG. 6. An external electronic device 105 may correspond to the external electronic device 105 of FIG. 6. A first application 131 may correspond to the first application 131 of FIG. 4. A second applications 133 and 133-1 may correspond to the second applications 133 and 133-1 of FIG. 4. Notification frameworks 401 and 403 may correspond to the notification frameworks 401 and 404 of FIG. 4. Data layers 402 and 403 may correspond to the data layers 402 and 403 of FIG. 4. A power manager 610 may correspond to the power manager 610 of FIG. 6. A logical connection 450 may correspond to the logical connection 450 of FIG. 4.

In FIG. 7, a flowchart of signals transmitted and/or received by the electronic device 101 according to an embodiment by using an established communication link based on the external electronic device 105 and a communication circuit (e.g., the communication circuit 260 of FIG. 2) is illustrated. For example, the electronic device 101 may obtain data 710 processed by the first application 131 based on the execution of the power manager 610 in a state (e.g., a sleep state) in which the processor (e.g., a processor 120 of FIG. 2) of the electronic device 101 receives power less than a designated threshold. The data 710 may include information indicating a state (e.g., the sleep state) of the electronic device 101. In the state, the electronic device 101 may obtain a parameter that is managed by the power manager 610 and indicates the state (e.g., the sleep state) of the electronic device 101 based on the execution of the first application 131. The electronic device may store the parameter in a memory (e.g., a memory 130 of FIG. 2) corresponding to the first application 131.

The electronic device 101 according to an embodiment may receive notification information by using the second application 133. The electronic device 101 may obtain data 711 on the notification information, which is processed by a notification framework 401, based on the execution of the second application 133. The electronic device 101 may obtain data 712 processed by the first application 131 based on the execution of the notification framework 401, for example. The data 712 may include information on the second application 133. The electronic device 101 may temporarily cease transmitting a signal for the data 712 to the external electronic device 105 based on identifying the data 712 based on the execution of the first application 131.

According to an embodiment, the electronic device 101 may transmit a data signal 713 to the external electronic device 105 by using the first application 131 independently of temporarily ceasing transmission of information on the data 712. For example, the data signal 713 may include information on data 710 processed by the first application 131. The external electronic device 105 may identify the state of the electronic device 101 based on receiving the data signal 713. For example, the external electronic device 105 may store parameters for the state of the electronic device 101 in a memory corresponding to a notification framework 404 (e.g., a memory 130-1 of FIG. 2).

The electronic device 101 according to an embodiment may bypass the first application 131 by using the second application 133 and may transmit a data signal 714 for notification information to the external electronic device 105. For example, the data signal 714 may include at least one of the data 430 and 432 of FIG. 4 and the data signal 431 of FIG. 4. For example, the external electronic device 105 may obtain data 715 processed by the notification framework 404 from the data signal 714 received from the electronic device 101 based on the execution of the second application 133-1. For example, the external electronic device 105 may display a visual object for the notification information on the display (e.g., a display 255 of FIG. 2) of the external electronic device 105 based on the parameter indicating the state of the electronic device 101 stored in the memory (e.g., the memory 130-1 of FIG. 2) and data 715.

The electronic device 101 according to an embodiment may identify a state (e.g., an active state) that displays a user interface for interacting with a user. For example, the electronic device 101 may obtain data 720 indicating the state and processed by the first application 131 based on the execution of the power manager 610. For example, the parameter for the data 720 may be stored in the memory (e.g., the memory 130 of FIG. 2) of the electronic device 101 corresponding to the first application 131. For example, the electronic device 101 may transmit a data signal 721 to the external electronic device 105 by using the first application 131 based on the obtained data 720. For example, the electronic device 101 may transmit the data signal 721 to the external electronic device 105 after a designated time, based on obtaining of the data 720. For example, transmitting of the data signal 721 by the electronic device 101 to the external electronic device 105 may be operated independently of receiving the notification information from an external object (e.g., server) by the electronic device 101 by using the second application 133. For example, the data signal 721 may include data processed by the data layer 402 based on the execution of the first application 131.

The external electronic device 105 according to an embodiment may obtain data processed by the notification framework 404 based on receiving the data signal 721. For example, the external electronic device 105 may store a parameter corresponding to the data in a memory corresponding to the notification framework 404. For example, the parameter may include information on an active state of the electronic device 101. For example, the external electronic device 105 may temporarily cease displaying the visual object for at least one notification information based on identifying information on the active state of the electronic device 101.

The electronic device 101 according to an embodiment may obtain the data 722 processed by the notification framework 401 based on the execution of the second application 133. For example, the data 722 may be an example of data generated based on the notification information different from the notification information included in the data 711. For example, the data 722 may include information on the second application 133. For example, the electronic device 101 may obtain data 723 processed (or managed) by the first application 131 based on the execution of the notification framework 401 based on obtaining the data 722. The electronic device 101 may temporarily cease transmitting a data signal based on the data 723 to the external electronic device 105 based on obtaining the data 723 by using the first application 131.

The electronic device 101 according to an embodiment may transmit the data signal 724 to the external electronic device 105, independently of obtaining the data 722 processed by the notification framework 401, based on the execution of the second application 133. For example, the timing at which the electronic device 101 acquires data 722 and the timing at which the data signal 724 is transmitted to the external electronic device 105 is not limited to those illustrated in FIG. 7. For example, the electronic device 101 may obtain the data 722 processed by the notification framework 401 after transmitting the data signal 724 to the external electronic device 105.

The external electronic device 105 according to an embodiment may obtain data 725 processed by the notification framework 404 from the data signal 724 received from the electronic device 101 based on the execution of the second application 133-1. For example, the data 725 may include data on the notification information received by using the second application 133 stored in the electronic device 101. For example, the external electronic device 105 may temporarily cease or delay the display of the visual object for the notification information on the display (e.g., the display 255 of FIG. 2) of the external electronic device 105 based on the data signal 721 and the data signal 724 received from the electronic device 101. For example, the external electronic device 105 may store the parameter for information on which the display of the visual object is temporarily ceased or delayed in a memory corresponding to the notification framework 404 (e.g., the memory 130-1 of FIG. 2).

The electronic device 101 according to an embodiment may identify the state (e.g., the sleep state) different from the active state of the electronic device 101 after transmitting the data signal 724 to the external electronic device 105. For example, the electronic device 101 may obtain data 730 corresponding to the different state processed by the power manager 610 and processed by the first application 131. For example, the electronic device 101 may transmit the data signal 731 for the obtained data 730 to the external electronic device 105 through the data layer 402 by using the first application 131.

The external electronic device 105 according to an embodiment may identify a state (e.g., a sleep state) of the electronic device 101 based on receiving the data signal 731 from the electronic device 101. For example, the external electronic device 105 may display the visual object for the notification information included in the data 725 on a display, based on a parameter for the information that temporarily ceases or delays the display of the visual object stored in memory corresponding to the data signal 731 and notification framework 404 received from the electronic device 105. For example, although not illustrated, the external electronic device 105 may output a sound signal corresponding to the notification information by using a speaker (not illustrated) included in the external electronic device 105 while displaying the visual object for the notification information on the display. For example, the external electronic device 105 may provide the notification information to the user by generating vibration by using an actuator (not illustrated) included in the external electronic device 105 while displaying the visual object for the notification information on the display.

In an embodiment, as described above, the electronic device 101, based on identifying a state that displays a user interface indicating the interaction between the electronic device 101 and the user or a state that is different from the state (e.g., the sleep state), may transmit information on one of the state or the different state (i.e., either the state or the different state) to the external electronic device 105. For example, transmission of the information may be operated independently of transmitting a data signal for notification information generated by at least one application (e.g., the second application 133) by the electronic device 101. For example, the electronic device 101 may control the display of at least one screen (e.g., a screen including the visual object for the notification information) by using the external electronic device 105 according to the state of the electronic device 101. The electronic device 101 may prevent the display of redundant notification information based on controlling the display of the at least one screen by the external electronic device 105.

Figure 8:
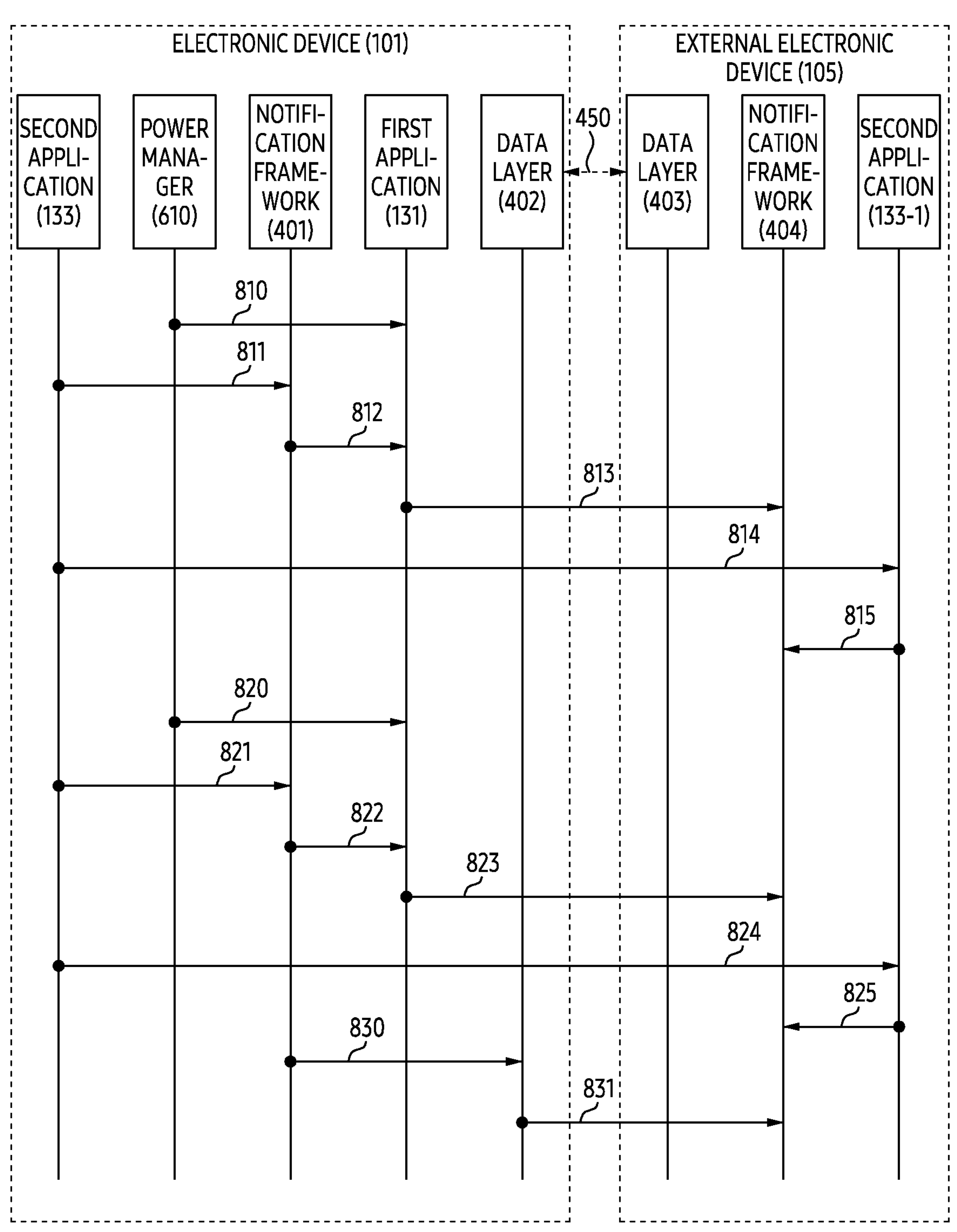
FIG. 8 illustrates an exemplary signal flowchart for transmitting information for controlling display of a notification message to an external electronic device based on identifying of notification message by the electronic device according to an embodiment.

FIG. 8 illustrates an exemplary signal flowchart for transmitting information for controlling display of a notification message to an external electronic device based on identifying of notification message by the electronic device according to an embodiment. An electronic device 101 may correspond to the electronic device 101 of FIG. 6. An external electronic device 105 may correspond to the external electronic device 105 of FIG. 6. A first application 131 may correspond to the first application 131 of FIG. 4. Second applications 133 and 133-1 may correspond to the second application 133 and 133-1 of FIG. 4. Notification frameworks 401 and 404 may correspond to the notification frameworks 401 and 404 of FIG. 4. Data layers 402 and 403 may correspond to the data layers 402 and 403 of FIG. 4. The power manager 610 may correspond to the power manager 610 of FIG. 6. A logical connection 450 may correspond to the logical connection 450 of FIG. 4. Data 810 may correspond to the data 710 of FIG. 7. Data 811 may correspond to the data 711 of FIG. 7. Data 812 may correspond to the data 712 of FIG. 7. A data signal 813 may correspond to the data signal 713 of FIG. 7. A data signal 814 may correspond to the data signal 714 of FIG. 7. Data 815 may correspond to the data 715 of FIG. 7. Data 820 may correspond to the data 720 of FIG. 7. Operations on data 810, 811, 812, 815, and 820 and/or data signals 813, and 814 performed by the electronic device 101 and/or the external electronic device 105 may be substantially the same as the operation performed by the electronic device 101 and/or the external electronic device 105 of FIG. 7. Hereinafter, any repetitive detailed descriptions of the same or like operations (e.g., operations on data 810, 811, 812, 815, and 820 and/or data signals 813, and 814) as those described above will be omitted.

The electronic device 101 according to an embodiment may store parameters for data 820 in a memory (e.g., memory 130 of FIG. 2) corresponding to the first application 131. For example, the electronic device 101 may receive the notification information by using the second application 133 while storing the parameter in the memory. The electronic device 101 may obtain data 821 processed by the notification framework 401 based on the execution of the second application 133. For example, the electronic device 101 may obtain data 822 processed by the first application 131 based on obtaining the data 821. For example, the electronic device 101 may transmit a data signal 823 to the external electronic device 105 by using the first application 131 based on obtaining of the data 822. For example, the data signal 823 may include information on a state (e.g., an active state) of the electronic device 101 included in the data 820. For example, the electronic device 101 may temporarily cease transmitting a data signal for data (e.g., the data 822) for the notification information generated by the second application 133 to the external electronic device, independently of transmitting the data signal 823 to the external electronic device 105.

The external electronic device 105 according to an embodiment may obtain data processed by the notification framework 404 from the data signal 823 received from the electronic device 101. The external electronic device 105 may identify information on the state (e.g., the active state) of the electronic device 101 based on the data. For example, the external electronic device 105 may store the parameter for the data in the memory (e.g., the memory 130-1 of FIG. 2) of the external electronic device 105 corresponding to the notification framework 404.

The electronic device 101 according to an embodiment may transmit the data signal 824 for the notification information received by using the second application 133 to the external electronic device 105 based on transmitting the data signal 823 to the external electronic device 105. For example, the data signal 824 may correspond to the data signal 724 of FIG. 7. For example, the data 825 obtained by the external electronic device 105 based on the data signal 824 received from the electronic device 101 may correspond to the data 725 of FIG. 7.

The electronic device 101 according to an embodiment may identify the state (e.g., the sleep state) that is different from the state (e.g., the active state) in which the processor (e.g., the processor 120 of FIG. 2) receives power exceeding the designated threshold. For example, the electronic device 101 may obtain data 830 processed by the first application 131 based on the execution of the power manager 610 based on identifying the different state. For example, based on obtaining data 830, the electronic device 101 may identify at least one of whether the data 821 and 822 have been obtained or whether the data signal 824 has been transmitted to the external electronic device 105. For example, based on identifying at least one of whether the data 821 and 822 have been obtained or whether the data signal 824 has been transmitted to the external electronic device 105, the electronic device 101 may transmit a data signal 831 corresponding to the obtained data 830 to the external electronic device 105 by using the first application 131. For example, although not illustrated, the electronic device 101 may temporarily refrain from transmitting the data signal 831 to the external electronic device 105 in case that at least one of the data 821 and 822 or the data signal 824 is not identified.

As described above, the electronic device 101 according to an embodiment may receive the notification information by using the second application 133. For example, the electronic device 101 may transmit the received notification information to the external electronic device 105 by bypassing the first application 131. For example, the electronic device 101 may transmit information on the state (e.g., the active state or the sleep state) of electronic device 101 independently of transmitting the notification information to the external electronic device 105. For example, the electronic device 101 may transmit information on the state to the external electronic device 105 based on identifying the notification information generated by the second application 133 independently of identifying the state of the electronic device 101. The electronic device 101 may reduce the amount of data transmission based on transmitting the state of the electronic device 101 to the external electronic device 105 based on receiving the notification information.

Figure 9:
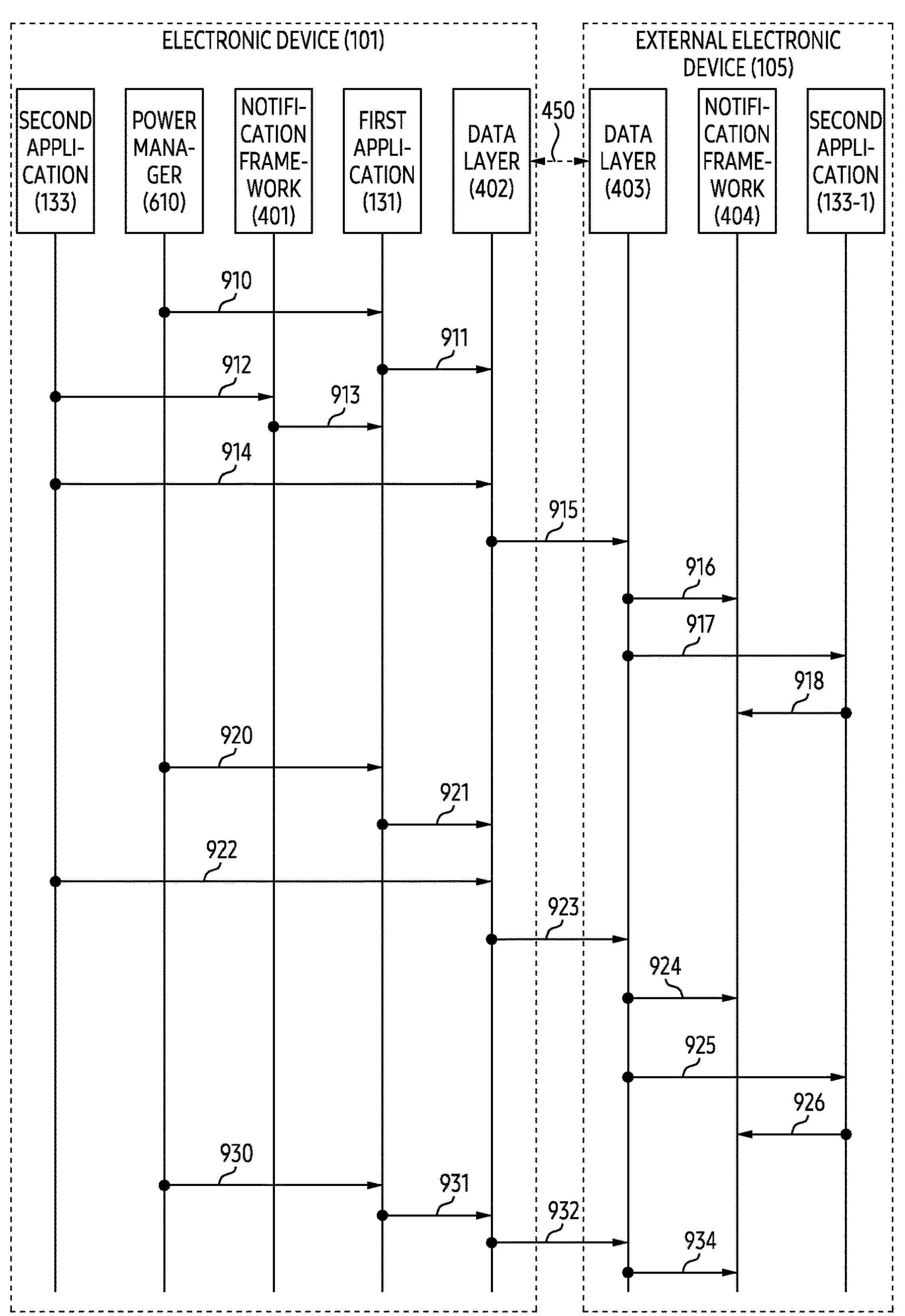
FIG. 9 illustrates an exemplary signal flowchart for simultaneously transmitting notification information and information for controlling display of notification by an electronic device according to an embodiment.

FIG. 9 illustrates an exemplary signal flowchart for simultaneously transmitting notification information and information for controlling display of notification by an electronic device according to an embodiment. An electronic device 101 may correspond to the electronic device 101 of FIG. 6. An external electronic device 105 may correspond to the external electronic device 105 of FIG. 6. A first application 131 may correspond to the first application 131 of FIG. 4. Second applications 133 and 133-1 may correspond to the second application 133 and 133-1 of FIG. 4. Notification frameworks 401 and 404 may correspond to the notification frameworks 401 and 404 of FIG. 4. Data layers 402 and 403 may correspond to the data layers 402 and 403 of FIG. 4. A power manager 610 may correspond to the power manager 610 of FIG. 6. A logical connection 450 may correspond to the logical connection 450 of FIG. 4.

The electronic device 101 according to an embodiment may identify a state (e.g., a sleep state) in which a processor (e.g., a processor 120 of FIG. 2) receives power less than a designated threshold. For example, the electronic device 101 may obtain data 910 processed by the first application 131 in the state based on the execution of the power manager 610. The electronic device 101 may obtain data 911 processed by the data layer 402 based on execution of the first application 131 based on the obtained data 910. For example, electronic device 101 may store a parameter for the data 911 in a memory corresponding to the data layer 402.

The electronic device 101 according to an embodiment may receive notification information from an external object (e.g., a server) by using the second application 133 independently of identifying the sleep state. For example, the electronic device 101 may obtain data 912 processed by the notification framework 401 based on the execution of the second application 133. For example, the data 912 may include information on the second application 133 and/or data on the notification information. For example, the electronic device 101 may obtain data 913 processed by the first application 131 based on the execution of the notification framework 401 based on obtaining the data 912. For example, the electronic device 101 may identify information of the second application 133 included in the data 913. For example, based on identifying the information, the electronic device 101 may temporarily cease transmitting a data signal for the notification information to the external electronic device 105 by using the first application 131.

The electronic device 101 according to an embodiment may obtain data 914 generated by the second application 133 and processed by the data layer 402 based on the execution of the second application 133. For example, the data 914 may include substantially the same information as notification information included in the data 912. For example, the electronic device 101 may transmit a data signal 915 to the external electronic device 105 based on the execution of the data layer 402. For example, the electronic device 101 may transmit the data signal 915 based on the logical connection 450 between the data layer 402 of the electronic device 101 and the data layer 403 of the external electronic device 105 through the established communication link with the external electronic device 105. For example, the data signal 915 may include information (e.g., information included in the data 911) on the state of the electronic device 101 and/or the notification information (e.g., information included in the data 914) received by using the second application 133. For example, although not illustrated, the data signal 915 may include a plurality of signals. Each of the plurality of signals may include information included in the data 911 and/or information included in the data 914.

The external electronic device 105 according to an embodiment may obtain data 916 and 917 processed by the notification framework 404 and/or the second application 132-1 from the data signal 915 received from the electronic device 101 based on the execution of the data layer 403. For example, the data 916 may include information on the state (e.g., the sleep state) of the electronic device 101. For example, the data 917 may include the notification information generated by the second application 133 stored in the electronic device 101. For example, the external electronic device 105 may store a parameter for the obtained data 916 in a memory (e.g., memory 130-1 of FIG. 2) corresponding to the notification framework 404. Based on the parameter, the external electronic device 101 may identify the state of the electronic device 101. For example, the external electronic device 105 may obtain data 918 processed by the notification framework 404 based on execution of the second application 133-1, based on obtaining the data 917. For example, the external electronic device 105 may display a visual object (or screen) for the notification information on a display (e.g., a display 255 of FIG. 2) based on the parameter and the data 918 stored in the memory.

The electronic device 101 according to an embodiment may obtain data 920 processed by the first application 131 based on the execution of the power manager 610 in a state in which the processor (e.g., the processor 120 of FIG. 2) receives power exceeding the designated threshold. For example, the data 920 may include information on the state. For example, the electronic device 101 may obtain data 921 processed by the data layer 402 based on the execution of the first application 131 by using the obtained data 920. The electronic device 101 may store the parameter indicating the state included in the data 921 in the memory of the electronic device 101 corresponding to the data layer 402.

The electronic device 101 according to an embodiment may receive the notification information (or the notification message) from the external object (e.g., the server) by using the second application 133. For example, the notification information may mean the notification information different from the notification information included in the data 914. For example, the electronic device 101 may bypass the first application 131 based on the execution of the second application 133, and may obtain data 922 processed by the data layer 402. For example, based on obtaining the data 922, the electronic device 101 may transmit a data signal 923 including information on the state of the electronic device 101 included in the data 921 and the notification information to the external electronic device 105. For example, the port number of the signal corresponding to the state may correspond to the port number of the notification framework 404. For example, the port number of the signal for the notification information may correspond to the port number for the second application 133-1.

The external electronic device 105 according to an embodiment may obtain data 924 processed by the notification framework 404 and/or data 925 processed by the second application 133-1 from the data signal 923 received from the electronic device 101. For example, the data 924 may include information on the state of electronic device 101. For example, the external electronic device 105 may store the parameter indicating the state of the electronic device 101 in the memory (e.g., the memory 130-1 of FIG. 2) processing the notification framework 404. For example, based on the parameter, the external electronic device 105 may identify that the electronic device 101 is in the state in which the user interface is displayed to interact with the user. For example, the external electronic device 105 may obtain data 926 processed by the notification framework 404 based on the execution of the second application 133-1 based on the obtained data 925. For example, the external electronic device 105 may temporarily delay displaying the visual object for the notification information on the display (e.g., the display 255 of FIG. 2) based on identifying the state of the electronic device 101 and identifying the notification information included in the data 926.

The electronic device 101 according to an embodiment may obtain data 930 processed by the first application 131 based on the execution of the power manager 610 in the state in which the processor (e.g., the processor 120 of FIG. 2) receives power less than the designated threshold. For example, the electronic device 101 may obtain data 931 processed by the data layer 402 based on the execution of the first application 131 by using the data 930. The electronic device 101 may store, for example, the parameter included in the data 931 in a memory corresponding to the data layer 402. For example, the electronic device 101 may transmit a data signal 932 corresponding to the data 931 to the external electronic device 105 based on storing the parameter in the memory.

The external electronic device 105 according to an embodiment may obtain data 934 processed by notification framework 404 based on execution of the data layer 403 from data signal 932 received from electronic device 101. For example, the external electronic device 105 may store the parameter corresponding to the data 934 in the memory (e.g., the memory 130-1 of FIG. 2) that processes the notification framework 404. For example, based on the parameter, the external electronic device 105 may identify that the electronic device 101 is in the state (e.g., the sleep state) different from the state displaying the user interface to interact with the user. For example, the external electronic device 105 may display the screen for the notification information on the display (e.g., the display 255 of FIG. 2) based on the notification information included in the parameter and data 926 and temporarily ceased displaying.

As described above, the electronic device 101 may adjust the amount of data transmitted to the external electronic device 105. For example, the electronic device 101 may transmit the data signal including information on the state of the processor 120 and/or the display 250 of the electronic device 101 and/or the notification information generated by at least one application (e.g., the second application 133) to the external electronic device 105. The electronic device 101 may adjust the amount of data usage and/or data transmission of the electronic device 101 based on transmitting the plurality of information as one signal. The electronic device 101 may reduce the amount of battery usage of the electronic device 101 based on adjusting the amount of data usage and/or data transmission.

Figure 10:
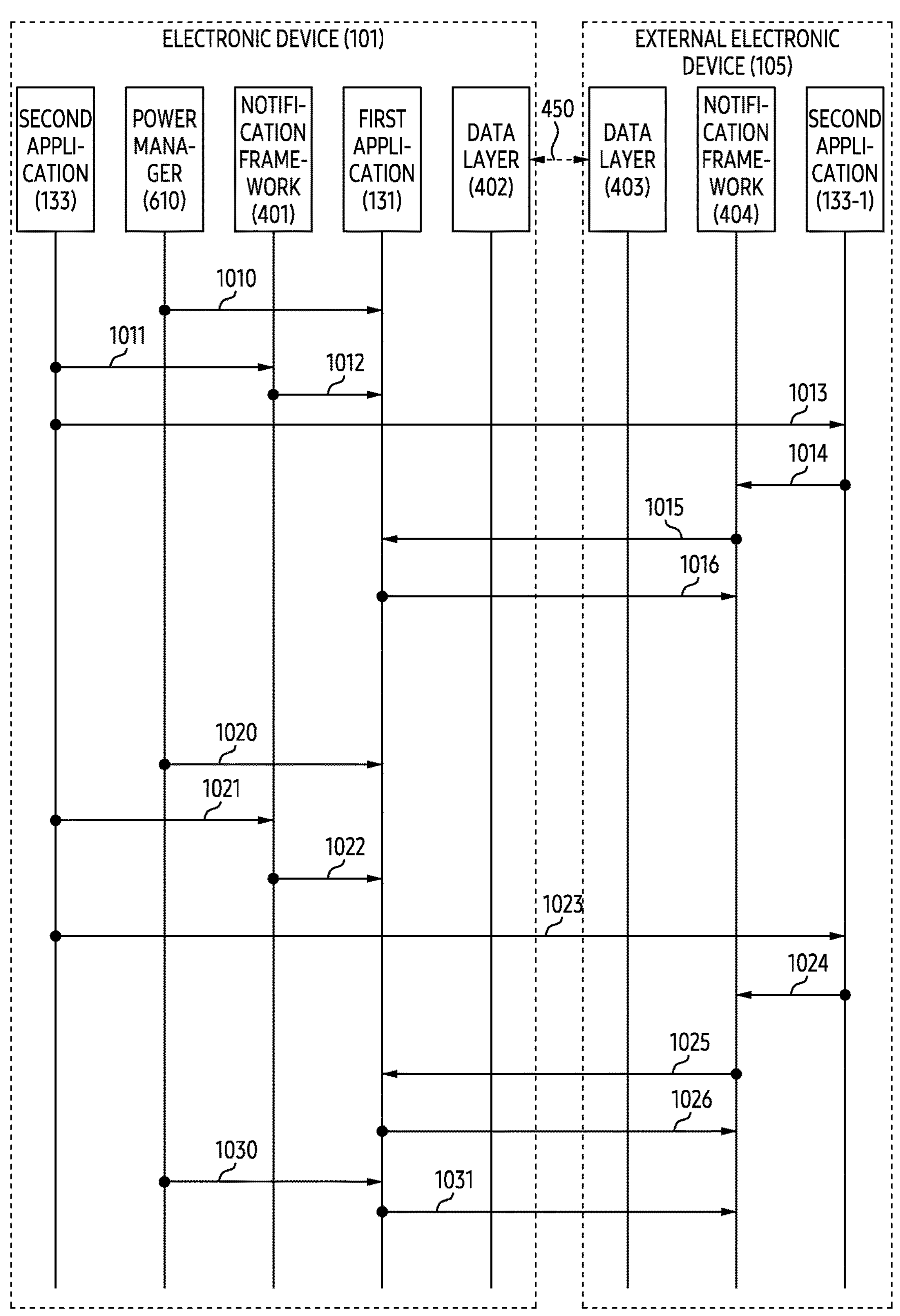
FIG. 10 illustrates an exemplary signal flowchart in which an external electronic device according to an embodiment requests information for controlling display of a notification message to the electronic device based on transmitting notification information.

FIG. 10 illustrates an exemplary signal flowchart in which an external electronic device according to an embodiment requests information for controlling display of a notification message to the electronic device based on transmitting notification information. Referring to FIG. 10, an electronic device 101 may correspond to the electronic device 101 of FIG. 6. An external electronic device 105 may correspond to the external electronic device 105 of FIG. 6. A first application 131 may correspond to the first application 131 of FIG. 4. Second applications 133 and 133-1 may correspond to the second application 133 and 133-1 of FIG. 4. Notification frameworks 401 and 404 may correspond to the notification frameworks 401 and 404 of FIG. 4. Data layers 402 and 403 may correspond to the data layers 402 and 403 of FIG. 4. A power manager 610 may correspond to the power manager 610 of FIG. 6. For example, data 1010 may be referred to data 710 of FIG. 7. Data 1011 may correspond to data 711 of FIG. 7. Data 1012 correspond to data 712 of FIG. 7. A data signal 1013 may correspond to a data signal 714 of FIG. 7. A logical connection 450 may correspond to the logical connection 450 of FIG. 4.

The external electronic device 105 according to an embodiment may obtain data 1014 processed by the notification framework 404, based on the execution of the second application 133-1, from the data signal 1013 received from the electronic device 101. For example, based on obtaining the data 1014, the external electronic device 105 may transmit a data signal 1015 requesting information on a state of the electronic device 101 to the electronic device 101 by using the notification framework 404. For example, the data signal 1015 may include a port number for the first application 131 of the electronic device 101. For example, the electronic device 101 may obtain data processed by the first application 131 from the data signal 1015 received from the external electronic device 105 based on the port number.

Based on receiving the data signal 1015 from the external electronic device 105, the electronic device 101 according to an embodiment may transmit a data signal 1016 including information on a parameter stored in a memory corresponding to the first application 131 to the external electronic device 105, by using the first application 131. For example, the data signal 1016 may include information on the state (e.g., a sleep state) of the electronic device 101.

The external electronic device 105 according to an embodiment may identify information on the state of electronic device 101 based on the execution of notification framework 404, based on receiving the data signal 1016 from electronic device 101. For example, the external electronic device 105 may store the parameter indicating information included in the data signal 1016 in the memory corresponding to the notification framework 404 (e.g., a memory 130-1 of FIG. 2). For example, the external electronic device 105 may display a visual object for the notification information on the display (e.g., the display 255 of FIG. 2) based on the notification information and the data signal 1016 included in the data 1014.

The electronic device 101 according to an embodiment may obtain the data 1020 processed by the first application 131 based on the execution of the power manager 610 in a state in which the user interface is displayed to interact with the user. For example, the data 1020 may correspond to data 720 of FIG. 7. Data 1021 may correspond to data 722 of FIG. 7. Data 1022 may correspond to data 723 of FIG. 7. A data signal 1023 may correspond to a data signal 724 of FIG. 7. Data 1024 may be correspond to data 725 of FIG. 7.

The external electronic device 105 according to an embodiment may transmit a data signal 1025 to the electronic device 101 by using the obtained data 1024 based on the execution of the second application 133-1. For example, the data signal 1025 may include information requesting information on the state of the electronic device 101.

According to an embodiment, the electronic device 101 may obtain data processed by the first application 131 from the data signal 1025 received from the external electronic device 105. For example, based on the data, the electronic device may transmit the data signal 1026 to the external electronic device 105 by using the first application 131 including information on the state of the electronic device 101. For example, the state of the electronic device 101 may mean a state in which electronic device 101 displays the user interface to interact with the user.

Based on receiving the data signal 1026, the external electronic device 105 according to an embodiment may store the parameter for the state of the electronic device 101 included in the data signal 1026 in the memory (e.g., the memory 130-1 of FIG. 2) corresponding to the notification framework 404. The external electronic device 105 may identify the state of electronic device 101 based on storing the parameter. For example, the external electronic device 105 may temporarily cease (or delay) displaying the visual object for the notification information included in the data 1024 on the display (e.g., the display 255 of FIG. 2) based on the parameter and the data 1024.

The electronic device 101 according to an embodiment may obtain the data 1030 processed by the first application 131 based on the execution of the power manager 610 in the state in which the processor (e.g., the processor 120 of FIG. 2) receives power less than a designated threshold. For example, the data 1030 may correspond to data 830 of FIG. 8. For example, data signal 1031 may correspond to data signal 831 of FIG. 8. For example, the external electronic device 105 may identify the state (e.g., the sleep state) of the electronic device 101 based on receiving the data signal 1031 from the electronic device 101. Based on identifying the state of the electronic device 101, the electronic device 101 may display the visual object for the notification information included in the data 1024 through the display (e.g., the display 255 of FIG. 2).

In an embodiment, as described above, the electronic device 101 may transmit the data signal for the received the notification information to the external electronic device 105 by using the second application 133. For example, the external electronic device 105 may display the visual object for the notification information according to the state of the electronic device 101. For example, in the state in which the electronic device 101 displays the user interface to interact with the user, the external electronic device 105 may temporarily cease displaying the visual object for the notification information. For example, to identify the state of the electronic device 101, the external electronic device 105 may transmit a signal requesting information on the state of the electronic device 101 to the electronic device 101. In case that the signal is received, the electronic device 101 may reduce the delay in data transmission by transmitting the data signal to the external electronic device 105.

Figure 11:
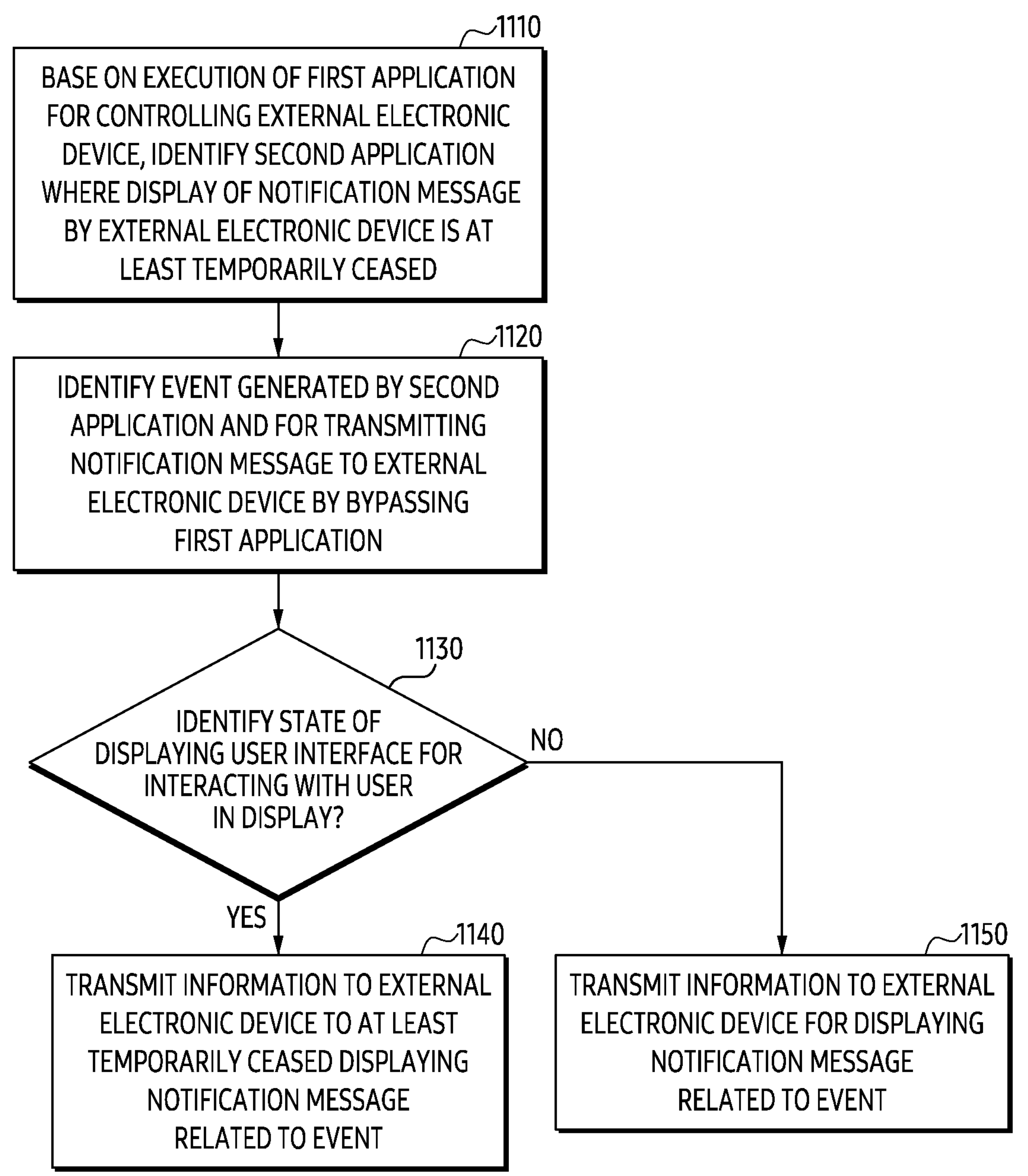
FIG. 11 is an exemplary flowchart illustrating an operation that an electronic device according to an embodiment transmit a notification message and information for controlling display of the notification message to an external electronic device.

FIG. 11 is an exemplary flowchart illustrating an operation that an electronic device according to an embodiment transmit a notification message and information for controlling display of the notification message to an external electronic device. The electronic device of FIG. 11 may be an example of an electronic device 101 of FIGS. 1 to 10. For example, at least one of the operations of FIG. 11 may be performed by the electronic device 101 of FIGS. 1 to 10 and/or a processor 120 of the electronic device 101.

Referring to FIG. 11, in operation 1110, a processor according to an embodiment may identify a second application in which the display of the notification message by the external electronic device is at least temporarily ceased based on the execution of a first application for controlling the external electronic device. For example, the external electronic device may correspond to the external electronic device 105 of FIG. 2. For example, the first application may be an example of an application (e.g., watch-plugin) for controlling the external electronic device among a plurality of applications stored in a memory (e.g., a memory 130 of FIG. 2) of the electronic device. The second application may be an example of the application used to receive notification information from an external object (e.g., a server) among the plurality of applications. For example, the processor may control display of the notification message generated by the second application, by using the external electronic device, based on the first application. For example, the processor may identify the application set to temporarily cease displaying the notification message in the external electronic device among the plurality of applications stored in the memory.

Referring to FIG. 11, in operation 1120, the processor according to an embodiment may identify an event generated by the second application and for transmitting the notification message to the external electronic device by bypassing the first application. For example, the processor may receive the notification information from the external object (e.g., the server) by using the second application. For example, the second application may be an example of the application in which data transmission of the notification information is temporarily ceased by using the first application to the external electronic device (e.g., the external electronic device 105 of FIG. 2). For example, the processor may establish a communication link by using the external electronic device and a communication circuit (e.g., a communication circuit 260 of FIG. 2). For example, the processor may synchronize some of the data stored in the external electronic device by using some of the data stored in the memory and the established communication link. For example, the processor may transmit a data signal for the notification information received by using the second application by bypassing the first application to synchronize with the second application stored in the external electronic device. For example, the data signal may correspond to the data signal 714 of FIG. 7. For example, the processor may identify the event by obtaining data (e.g., data 420 of FIG. 4) processed by notification framework (e.g., notification framework 401 of FIG. 4) based on the execution of the second application.

Referring to FIG. 11, in operation 1130, the processor according to an embodiment may determine whether the state of displaying a user interface for interacting with the user within the display has been identified. For example, based on the first application, the processor may transmit information requesting that the external electronic device temporarily ceases displaying at least one screen (e.g., a visual object for the notification information) in case that the electronic device is in the state. For example, the information may correspond to a data signal 601 of FIG. 6. For example, the processor may obtain data (e.g., data 710 of FIG. 7) processed by the first application based on the execution of a power manager (e.g., a power manager 610 of FIG. 6) in the state (e.g., an active state) displaying the user interface for interacting with the user in the display. For example, the parameter for the data may be stored in the memory (e.g., the memory 130 of FIG. 2) corresponding to the first application.

Referring to FIG. 11, in operation 1140, in case of identifying the state of displaying the user interface (operation 1130—yes), the processor according to an embodiment may transmit, to the external electronic device, information for at least temporarily ceasing the display of the notification message related to (or generated based on the event) the event by the external electronic device. For example, the processor may transmit the information to the external electronic device based on obtaining data (e.g., data 720 of FIG. 7) processed by the first application based on the execution of the notification manager. For example, the processor may transmit the information to the external electronic device based on obtaining data processed by the notification framework (e.g., data on notification information (data 821 of FIG. 8)) based on the execution of the second application. For example, the processor may obtain data processed by the data layer based on the execution of the first application from the information. For example, the processor may transmit the data signal for data processed by the data layer by using a logical connection (e.g., a logical connection 450 of FIG. 4) based on the communication link established with the external electronic device. For example, the data signal may include at least one port number among a plurality of layers stored in the external electronic device. For example, the external electronic device may identify the port number included in the received data signal. For example, the external electronic device may obtain data processed by the layer corresponding to the port number based on the identified port number. For example, in case that the data signal includes the port number for the notification framework (e.g., the notification framework 404 of FIG. 4) of the external electronic device, the external electronic device may identify data processed by the notification framework based on the execution of the data layer (e.g., the data layer 403 of FIG. 4). Based on the identified data, the external electronic device may identify the state of the electronic device. For example, the external electronic device may store the parameter for the identified data in the memory (e.g., the memory 130-1 of FIG. 2) corresponding to the notification framework. For example, the external electronic device may temporarily cease displaying the visual object for the notification information on the display (e.g., the display 255 of FIG. 2) based on the data on the received notification information and the parameter.

Referring to FIG. 11, in case that the state of displaying the user interface is not identified (operation 1130—no), in operation 1150, the processor according to an embodiment may transmit information for displaying the notification message related to the event by the external electronic device to the external electronic device. For example, the processor may identify the state (e.g., the sleep state) different from the state (e.g., the active state) displaying the user interface. For example, the different state may correspond to the state in which the processor receives power less than the designated threshold. For example, the processor may transmit information on the different state to the external electronic device. For example, the external electronic device may obtain data processed by the notification framework (e.g., the notification framework 404 of FIG. 4) based on the received information. Based on the data, the external electronic device may identify the state (e.g., the sleep state) of the electronic device. The external electronic device may display the visual object for the temporarily ceased the notification information based on identification of the state of the electronic device.

In an embodiment, as described above, the electronic device (e.g., the electronic device 101 of FIG. 1) may control the external electronic device (e.g., the external electronic device 105 of FIG. 2) by using the application (e.g., the first application 131 of FIG. 2) stored in the memory (e.g., the memory 130 of FIG. 2). The electronic device and/or the processor of the electronic device (e.g., the processor 120 of FIG. 2) may temporarily cease transmitting data on the notification information generated by the second application stored in the memory by using the first application. The electronic device and/or the processor of the electronic device may transmit data on the notification information to the external electronic device by using the second application, independently of temporarily ceasing transmission of the data by using the first application. The electronic device and/or the processor of the electronic device may transmit data on the state (e.g., the active state or the sleep state) of the processor to the external electronic device. The electronic device and/or the processor of the electronic device may prevent the user of the electronic device from providing a plurality of notification information by a plurality of electronic devices (e.g., the electronic device 101 and the external electronic device 105) for the same notification information, based on temporary ceasing data transmission by using the first application and/or data transmission for the state of the processor.

Figure 12:
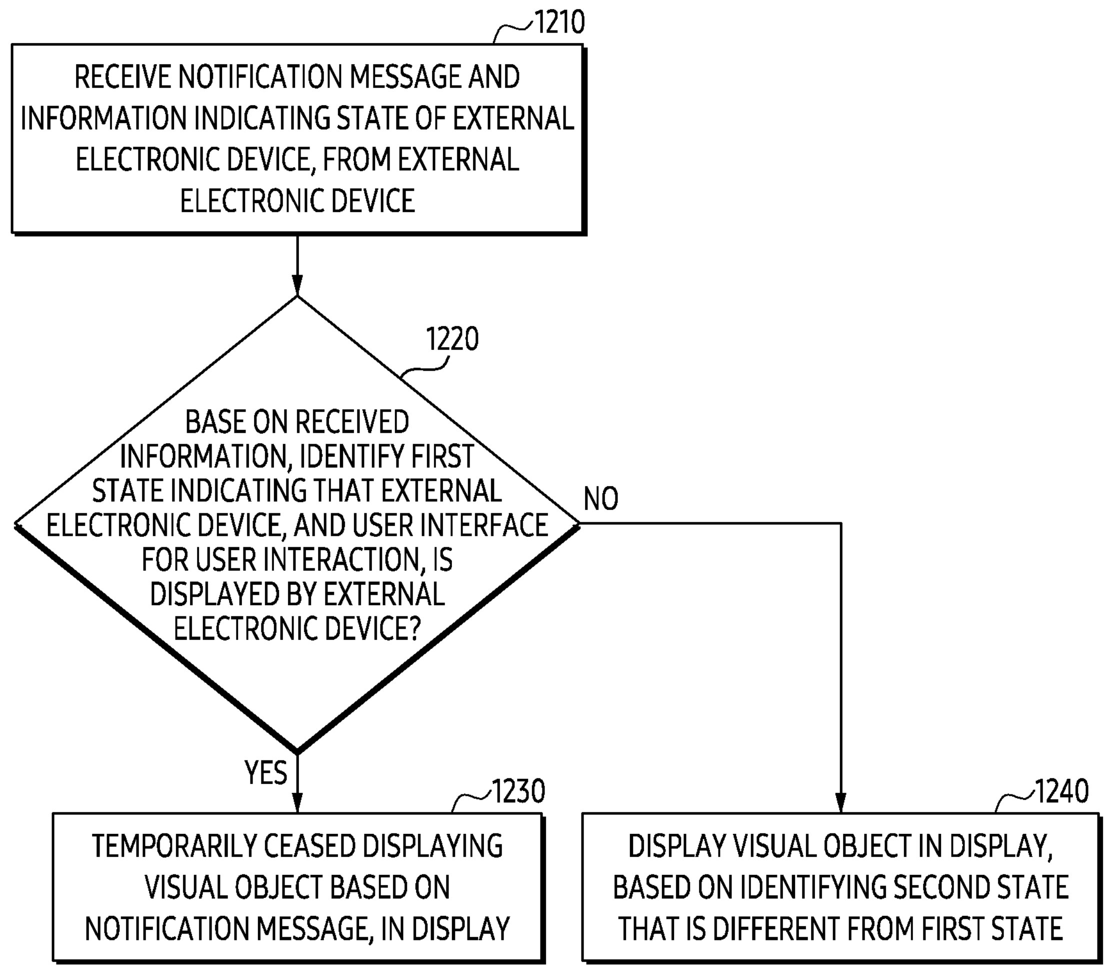
FIG. 12 is an exemplary flowchart illustrating an operation that an external electronic device according to an embodiment control display of a notification message by using at least one information received from the electronic device.

FIG. 12 is an exemplary flowchart illustrating an operation that an external electronic device according to an embodiment control display of a notification message by using at least one information received from the electronic device. The electronic device of FIG. 12 may be an example of the external electronic device 105 of FIGS. 2 to 10. For example, at least one of the operations of FIG. 12 may be performed by the external electronic device 105 and/or the processor of the external electronic device of FIGS. 2 to 10.

Referring to FIG. 12, in operation 1210, the processor according to an embodiment may receive the notification message and information indicating a state of the external electronic device from the external electronic device. For example, the external electronic device may correspond to the electronic device 101 of FIGS. 1 to 10. For example, the information indicating the notification message may be an example of information generated by the electronic device and/or an application (e.g., a second application 133 of FIG. 2) stored in the external electronic device. For example, the information indicating the notification message may be an example of information received, by bypassing an application (e.g., a first application 131 of FIG. 2) stored in the external electronic device and for controlling the electronic device.

Referring to FIG. 12, in operation 1220, based on the received information, the processor according to an embodiment may identify whether a first state indicating that the user interface for interaction between the external electronic device and the user is displayed by the external electronic device is identified. For example, the first state may correspond to the state (e.g., the active state) in which the processor (e.g., a processor 120 of FIG. 2) of the external electronic device receives power exceeding a designated threshold. For example, the processor may obtain data processed by the notification framework (e.g., the notification framework 404 of FIG. 4) from information indicating the state of the external electronic device. For example, the processor may store the data in a memory (e.g., a memory 130-1 of FIG. 2) corresponding to the notification framework.

Referring to FIG. 12, in operation 1230, in case that the first state is identified (operation 1220—yes), the processor according to an embodiment may temporarily cease displaying a visual object based on the notification message within the display. For example, the external electronic device may request the electronic device to temporarily cease displaying at least one screen in the first state by using the application (e.g., the first application 131 of FIG. 2). For example, based on the request, the processor may temporarily cease displaying the visual object based on the notification message within the display (e.g., a display 255 of FIG. 2) in the first state.

Referring to FIG. 12, in operation 1240, in case that the first state is not identified (operation 1220—No), the processor according to an embodiment may display the visual object in the display based on identifying a second state different from the first state. For example, the second state different from the first state may mean the state (e.g., the sleep state) in which a processor of the external electronic device receives power less than the designated threshold. For example, the processor may display the visual object based on the notification message that is temporarily ceased in the display in the second state.

In an embodiment, as described above, the electronic device (e.g., the external electronic device 105 of FIG. 2) may receive a plurality of data from the external electronic device (e.g., the electronic device 101 of FIG. 2). For example, the data may include at least one of notification information generated by at least one application, information requesting to temporarily cease the display of the visual object based on the state of the external electronic device (e.g., the active state or the sleep state) and notification information, or information requesting to control the display of the visual object according to the state of an external electronic device. For example, the electronic device may refrain from displaying a plurality of notification information based on transmitting or receiving the at least one information with the external electronic device.

Figure 13:
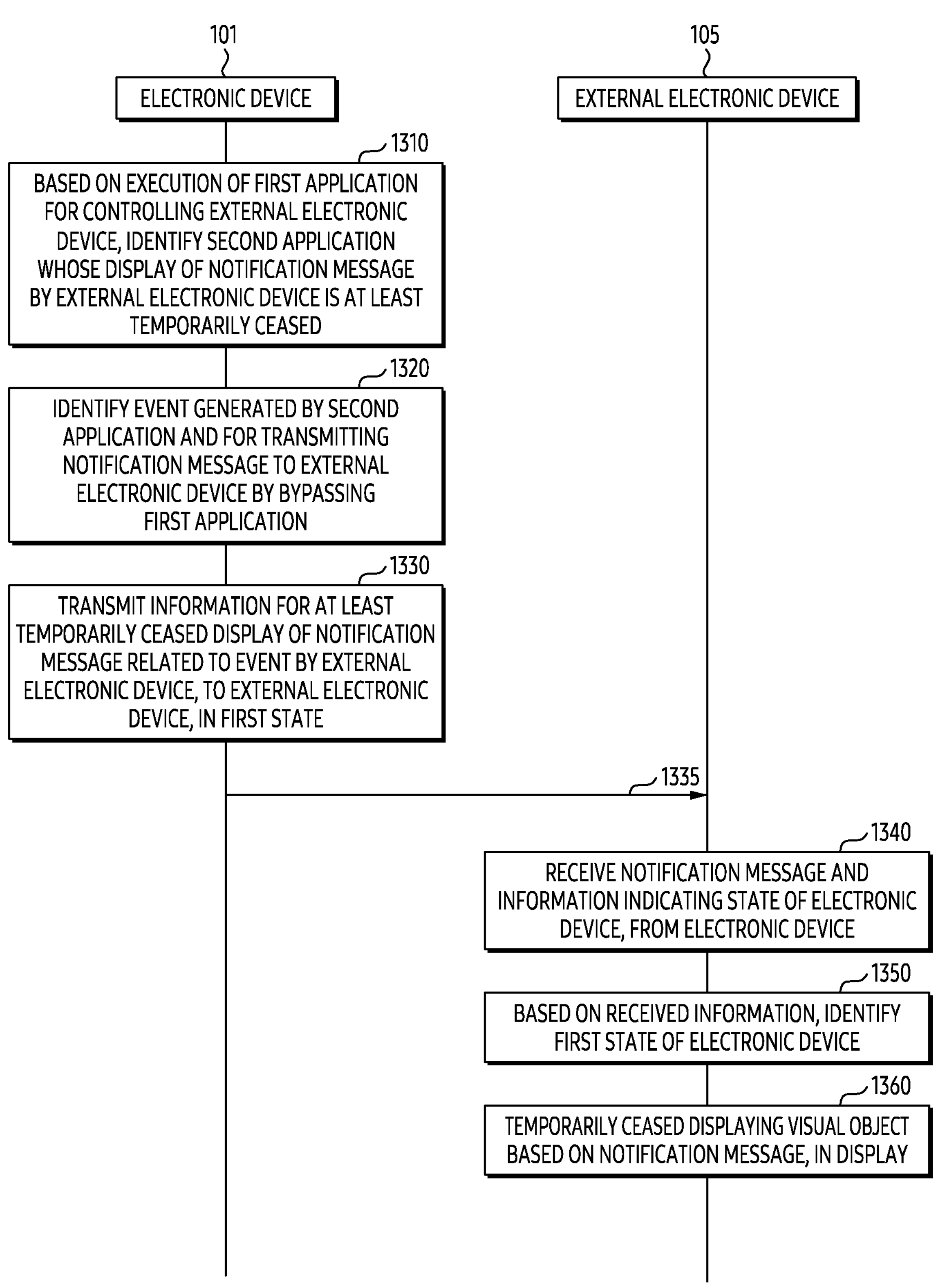
FIG. 13 illustrates an exemplary signal flowchart between an electronic device and an external electronic device according to an embodiment.

FIG. 13 illustrates an exemplary signal flowchart between an electronic device and an external electronic device according to an embodiment. The electronic device of FIG. 13 may be an example of an electronic device 101 of FIGS. 1 to 10. For example, at least one of the operations of FIG. 13 may be performed by the electronic device 101 of FIGS. 1 to 10 and/or the processor 120 of the electronic device. An external electronic device of FIG. 13 may be an example of an external electronic device 105 of FIGS. 2 to 10. For example, at least one of the operations in FIG. 13 may be performed by the external electronic device 105 and/or the processor of the external electronic device of FIGS. 2 to 10.

Referring to FIG. 13, in operation 1310, the electronic device 101 according to an embodiment may identify a second application in which the display of the notification message by the external electronic device 105 is at least temporarily ceased, based on the execution of a first application for controlling the external electronic device 105. For example, the first application may correspond to a first application 131 of FIG. 2. For example, by using the first application 131, the electronic device 101 may set some of a plurality of applications stored in a memory (e.g., a memory 130 of FIG. 2) to at least temporarily cease displaying the notification message by the external electronic device. For example, the second application (e.g., a second application 133 of FIG. 2) may be included in some of the plurality of applications.

Referring to FIG. 13, in operation 1320, the electronic device 101 according to an embodiment may identify an event generated by the second application and for transmitting the notification message to the external electronic device by bypassing the first application. For example, the electronic device 101 may receive notification information from at least one external object (e.g., a server) by using the second application (e.g., the second application 133 of FIG. 2). For example, the electronic device 101 may obtain data processed by the first application from the notification information based on the execution of the second application. For example, based on the data, the electronic device 101 may temporarily refrain from transmitting a data signal based on the data to the external electronic device 105 by using the first application. For example, the electronic device 101 may identify data processed by a data layer (e.g., a data layer 402 of FIG. 4) of the electronic device 101 from the notification information based on the execution of the second application. For example, an event may mean an example of an event in which the electronic device 101 transmits at least one data based on at least one communication link to synchronize the second application (e.g., the second application 133 of FIG. 2) stored in the memory (e.g., the memory 130 of FIG. 2) with the second application (e.g., the second application 133-1 of FIG. 4) stored in the memory (e.g., the memory 130-1 of FIG. 2) of the external electronic device 105.

Referring to FIG. 13, in operation 1330, the electronic device 101 according to an embodiment may transmit information (e.g., data signal 1335) for at least temporarily ceasing the display of the notification message related to the event by the external electronic device to the external electronic device in the first state. For example, the first state may correspond to either the state in which the processor of the electronic device 101 receives power exceeding a specified threshold, or the state in which the user interface is displayed on the display (e.g., the display 250 of FIG. 2) to interact with the user of the electronic device 101. For example, in the first state, the electronic device 101 may transmit information (e.g., a data signal 601 of FIG. 6) requesting to temporarily refrain from displaying the screen (e.g., the visual object based on the notification information) by the external electronic device, to the external electronic device 105, by using the first application. For example, the external electronic device 105 may store a parameter indicating the received information in the memory (e.g., the memory 130-1 of FIG. 2) corresponding to the notification framework (e.g., the notification framework 404 of FIG. 4) based on the received information.

Referring to FIG. 13, in operation 1340, the external electronic device 105 according to an embodiment may receive the notification message and information indicating the state of the electronic device 101 from the electronic device 101. For example, port numbers for information indicating the notification message and information indicating the state of the electronic device 101 may be different from each other. For example, the external electronic device 105 may obtain data processed by the second application (e.g., the second application 133-1 of FIG. 4) from information indicating the notification message. For example, the external electronic device 105 may obtain data processed by the notification framework (e.g., the notification framework 404 of FIG. 4) from information indicating the state of the electronic device 101.

Referring to FIG. 13, in operation 1350, the external electronic device 105 according to an embodiment may identify a first state of the electronic device based on the received information. For example, the external electronic device 105 may identify the state (e.g., the first state) of the electronic device 101 based on receiving the data signal 1335. For example, the external electronic device 105 may store information indicating the state (e.g., the first state) of the electronic device 101 in the memory corresponding to the notification framework (e.g., the notification framework 404 of FIG. 4).

Referring to FIG. 13, in operation 1360, the external electronic device 105 according to an embodiment may temporarily cease displaying the visual object based on the notification message in the display. For example, the external electronic device 105 may receive information on the second state different from the first state from the electronic device 101. For example, the second state may be an example of the state in which the processor of the electronic device 101 receives power less than the designated threshold. For example, in the second state, the external electronic device 105 may display the visual object whose display is temporarily ceased within the display (e.g., the display 255 of FIG. 2).

In an embodiment, as described above, the electronic device 101 and the external electronic device 105 may exchange at least one data based on the communication link. Each of the electronic device 101 and/or the external electronic device 105 may store an application including the same information as each other. The electronic device 101 and/or the external electronic device 105 may receive the notification information by using the application. The electronic device 101 and/or the external electronic device 105 may synchronize the received notification information with each other based on the communication link by using the application. The electronic device 101 and/or the external electronic device 105 may provide the received notification information to the user by using either the electronic device 101 or the external electronic device 105 based on the synchronization.

For a user using a plurality of electronic devices, a method for preventing display of the notification message indicating a plurality of notification information by a plurality of electronic devices for the same notification information may be desired.

As described above, in the electronic device 101 according to an embodiment, the electronic device may include a display 250, a communication circuit 260, a memory 130, and a processor 120. The processor may identify, based on executing a first application 131 for controlling an external electronic device 105, a second application 133 being ceased at least temporarily displaying of a notification message by the external electronic device. The processor may identify an event for transmitting the notification message generated by the second application to the external electronic device by bypassing the first application. The processor may transmit first information 724; 824; 923 for being ceased at least temporarily displaying of a notification message related to the event by the external electronic device, to external electronic device, based on identifying the event, in a first state of displaying a user interface for interacting with a user in the display.

For example, the processor may transmit, second information 731; 831; 932 that is different from the first information, and is used to display the notification message generated by the second application by the external electronic device, to the external electronic device based on the first application in a second state different from the first state.

For example, the processor may refrain from transmitting the notification message generated by the second application to the external electronic device, based on the first application, in response to the event.

For example, the processor may transmit the notification message generated by the second application, to external electronic device independently of an execution of the first application, based on identifying the event.

For example, the processor may transmit the first information to the external electronic device, when transmitting the notification message generated by the second application.

For example, the processor may transmit the first information in response to a signal for identifying a state of the electronic device, which is transmitted from the external electronic device when the external electronic device receives the notification message generated by the second application.

For example, the processor may identify an input for indicating to stop displaying the notification message generated by the second application by the external electronic device, based on a list of a plurality of applications 320 provided by the first application.

For example, the processor may identify whether the notification message generated by the second application has been transmitted in the second state.

For example, the processor may identify other event for transmitting a second notification message of a third application 135 different from the second application and different from a first notification message which is the notification message generated by the second application. The processor may transmit the second notification message to the external electronic device based on the first application, based on identifying the other event.

For example, the processor may display other user interface 310 indicating whether to display a notification message by the external electronic device based on an execution of the first application. The processor may display a first visual object 350-1 indicating that a display of a notification message by the external electronic device is being ceased at least temporarily, as associated with a second visual object indicating the second application, in the other user interface. The processor may display, in the other user interface, a third visual object 350-2 indicating that a display of the notification message by the external electronic device is allowed, as association with a fourth visual object indicating the third application.

As described above, in a method (e.g., a controlling method or an operating method) of the electronic device 105 according to an embodiment, the method may include receiving information indicating a notification message 714; 724; 814; 824; 1013; 1024 and a state 713; 721; 731; 813; 823; 831 of an external electronic device 101 from the external electronic device. The method may include refraining from displaying a visual object based on the notification message, in a display 255 of the electronic device, based on identifying a first state which is a state indicating that a user interface for interaction between the external electronic device and a user is displayed by the external electronic device, based on the received information. The method may include displaying the visual object, in the display of the electronic device, based on identifying a second state different from the first state, based on the received information.

For example, the receiving the information may further include receiving the information indicating the state of the external electronic device, based on an application for interworking with the external electronic device.

For example, the receiving information may further include requesting the information indicating the state of the external electronic device, to the external electronic device, based on whether the notification message is transmitted by bypassing an application 131 executed by the external electronic device for communication between the external electronic device and the electronic device.

For example, the receiving information may further include transmitting, to the external electronic device, a signal 1015; 1025 for requesting transmission of the information indicating the state of the external electronic device based on an execution of the application.

For example, the receiving information may further include displaying other visual object based on other notification message in the display, in response to the other notification message received from the external electronic device based on an execution of an application, independently of the notification message transmitted by bypassing the application for communication between the external electronic device and the electronic device executed by the external electronic device.

As described above, in a method (e.g., a controlling method or an operating method) of the electronic device 101 according to an embodiment, the method may include identifying, based on executing a first application 131 for controlling an external electronic device 105, a second application 131 being ceased at least temporarily displaying of a notification message by the external electronic device. The method may include identifying an event for transmitting a notification message generated by the second application to the external electronic device, in which a third application 133-1 having a package name of the second application is installed, by bypassing the first application. The method may include being ceased at least temporarily transmitting a signal as associated with the event to the external electronic device, by using the first application, based on identifying the event.

For example, the identifying the event may further include transmitting information 724; 824; 923 for being ceased at least temporarily a display of a notification message as associated with the event by the external electronic device, to external electronic device, based on identifying the event by using the first application.

For example, the information may include an information about a first state for displaying a user interface for interacting with a user in a display of the electronic device. The identifying the event may further include transmitting an information 731; 831; 932 for displaying the notification message by the external electronic device, to external electronic device, based on the first application, in a second state different from the first state.

For example, the identifying the second application may further include receiving an information about a plurality of applications 320 installed in the external electronic device from the external electronic device. The identifying the second application may include mapping the third application and the second application, based on the received information about the plurality of applications. The identifying the second application may include identifying an input for indicating to temporarily stop displaying the notification message generated by the second application by controlling the external electronic device based on a list of the plurality of applications provided by the first application.

For example, the identifying the event may further include transmitting another signal as associated with other event to the external electronic device, by using the first application, based on identifying the other event for displaying other notification message generated by a fourth application 135 by controlling the external electronic device.

As described above, the method of the electronic device (e.g., the electronic device 101 of FIG. 1) according to an embodiment may include identifying a second application (e.g., the second application 133 of FIG. 2) where the display of the notification message generated by the second application by the external electronic device is at least temporarily ceased, based on the execution of a first application (e.g., the first application 131 of FIG. 2) for controlling the external electronic device (e.g., the external electronic device 105 of FIG. 2). The method of the electronic device may include identifying an event generated by the second application and for bypassing the first application and transmitting a notification message to the external electronic device. The method of the electronic device may include transmitting information (e.g., data signal 724 of FIG. 7, data signal 824 of FIG. 8, or data signal 923 of FIG. 9) for at least temporarily stopping display of the notification message related to the event, by the external electronic device, based on identifying the event, in a state of displaying a user interface for interacting with a user in a display of the electronic device, to the external electronic device.

For example, the method of the electronic device may include transmitting second information (e.g., a data signal 731 of FIG. 7, a data signal 831 of FIG. 8, or a data signal 932 of FIG. 9), different from first information which is the information for at least temporarily stopping display of the notification message related to the event generated by the second application, and for displaying the notification message by the external electronic device, to the external electronic device, based on the first application, in a second state different from a first state which is the state of displaying the user interface for interacting with the user in the display.

For example, the method of the electronic device may include refraining from transmitting the notification message to the external electronic device based on the first application in response to an event generated based on the second application and from requesting transmission of the notification message based on the first application.

For example, the method of the electronic device may include transmitting the notification message to the external electronic device independently of execution of the first application based on identifying the event.

For example, the method of the electronic device may include transmitting the information when transmitting the notification message to the external electronic device.

For example, the method of the electronic device may include transmitting the information in response to a signal, which is transmitted from the external electronic device when the external electronic device receives the notification message and identifies the state of the electronic device.

For example, the method of the electronic device may include identifying an input indicating that the notification message generated by the second application is ceased being displayed through the external electronic device based on a list of a plurality of applications (e.g., a plurality of applications 320 of FIG. 3) provided by the first application and stored in a memory thereof.

For example, the method of the electronic device may include identifying whether the notification message has been transmitted in the second state.

For example, the method of the electronic device may include identifying other event for transmitting a second notification message, which is generated by a third application (e.g., a third application 135 of FIG. 2) different from the second application and is different from a first notification message which is the notification message of the second application. The method of the electronic device may include transmitting the second notification message to the external electronic device based on the first application, based on identifying the other event.

For example, the method of the electronic device may include displaying other user interface (e.g., a screen 310 of FIG. 3) indicating whether to display a notification message by the external electronic device based on the execution of the first application. The method of the electronic device may include displaying a first visual object (e.g., a visual object 350-1 of FIG. 3) indicating that the display of a notification message by the external electronic device is at least temporarily ceased in association with a second visual object indicating the second application, in the other user interface. The method of the electronic device may include displaying a third visual object (e.g., a visual object 350-2 of FIG. 3) indicating that the display of a notification message by the external electronic device is allowed, in association with a fourth visual object indicating the third application, in the other user interface.

The method of the electronic device (e.g., the electronic device 101 of FIG. 1) according to an embodiment may include identifying the second application (e.g., the second application 133 of FIG. 2) in which the display of a notification message by the external electronic device is at least temporarily ceased based on execution of the first application (e.g., the first application 131 of FIG. 2) for controlling the external electronic device (e.g., the external electronic device 105 of FIG. 2). The method may include an operation of identifying an event for transmitting a notification message to the third application generated by the second application, installed in the external electronic device, and having a package name of the second application (e.g., the second application 133-1 of FIG. 4) to the external electronic device by bypassing the first application. The method may include at least a temporary ceasing transmitting a signal related to the event to the external electronic device based on the execution of the first application based on identifying the event.

For example, the method may include transmitting information (e.g., a data signal 724 of FIG. 7, a data signal 824 of FIG. 8, and/or a data signal 923 of FIG. 9) to cease at least temporarily displaying a notification message related to the event by the external electronic device, to the external electronic device, based on identifying the event by using the first application.

For example, the information may include information about a first state in which a user interface for interacting with a user is displayed in the display of the electronic device. The method may further include transmitting information (e.g., a data signal 731 of FIG. 7, a data signal 831 of FIG. 8, and/or a data signal 932 of FIG. 9) for displaying the notification message by the external electronic device to the external electronic device based on the first application in a second state different from the first state.

For example, the method may include receiving information about a plurality of applications 320 installed in the external electronic device from the external electronic device. The method may include mapping the third application and the second application based on the received information on the plurality of applications. The method may include identifying an input indicating temporarily ceasing displaying the notification message provided by the first application and generated by the second application based on the list of the plurality of applications received by the external electronic device.

For example, the method may further include transmitting another signal related to the other event to the external electronic device using the first application, based on identifying another event for displaying a notification message generated from a fourth application (e.g., the third application 135 of FIG. 2) different from the second application and based on the external electronic device.

The above-described devices may be implemented as hardware components, software components, and/or a combination of hardware components and software components. For example, the devices and components described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may perform an operating system (OS) and one or more software applications performed on the operating system. Also, the processing device may access, store, manipulate, process, and generate data in response to the execution of the software. For convenience of understanding, it may be described that one processing device is used. However, those skilled in the art may understand that the processing device may include a plurality of processing elements and/or a plurality of types of processing elements. For example, the processing device may include a plurality of processors or one processor and one controller. In addition, other processing configurations such as parallel processors are also possible.

The software may include a computer program, a code, an instruction, or a combination of one or more thereof, and may configure a processing device to operate as desired or may independently or collectively instruct the processing device. Software and/or data may be interpreted by a processing device or may be embodied in any type of machine, component, physical device, computer storage medium, or device to provide a command or data to the processing device. Software may be distributed on a networked computer system and stored or executed in a distributed manner. Software and data may be stored in one or more computer-readable recording media.

The method according to an embodiment may be implemented in the form of program commands executable by various computer means and recorded on a computer-readable medium. In such a case, the medium may continue to store a computer-executable program or temporarily store the program for execution or download. Further, the medium may be various recording means or storage means in which a single piece of hardware or a plurality of pieces of hardware are combined, and the medium is not limited to a medium directly connected to a computer system, and may be distributed on a network. Examples of the medium may include a magnetic medium such as a hard disk, a floppy disk, and a magnetic tape, an optical recording medium such as a compact disc read only memory (CD-ROM) and a digital versatile disc (DVD), a magneto-optical medium such as a floptical disk, and a read only memory (ROM), a random access memory (RAM), a flash memory, etc. configured to store program instructions. Further, examples of other media may include recording media or storage media managed by an application store that distributes applications, a site that supplies or distributes various other software, a server, and the like.

While various embodiments have been described with reference to limited embodiments and drawings, it will be understood by those having ordinary skill in the art that various changes in form and details may be made from the foregoing description. For example, even if the described techniques are performed in a different sequence from the described method, and/or components such as the described system, structure, device, circuit, etc. are combined or combined in a different form from the described method, or are replaced or substituted by other components or equivalents, appropriate results may be achieved.

Therefore, other implementations, other examples, and those equivalent to the scope of the appended patent claim may also fall within the scope of the patent claim to follow.

What is claimed is:

1. An electronic device comprising:

communication circuitry;

memory comprising one or more storage mediums storing instructions; and at least one processor comprising processing circuitry;

wherein the instructions, when executed by the at least one processor individually or collectively, cause the electronic device to:

identify, through a first application, a notification message generated by a second application being ceased transmitting the notification message to a notification framework of an external electronic device through the first application of the electronic device; and transmit, to a counterpart second application of the external electronic device through the second application of the electronic device by bypassing the first application, the notification message, without transmitting, to the notification framework of the external electronic device through the first application, the notification message based on identifying, through the first application, the notification message generated by the second application.

2. The electronic device of claim 1, wherein the instructions, when executed by the at least one processor individually or collectively, cause the electronic device to:

transmit, to the notification framework of the external electronic device through the first application, first information to be used by the external electronic device to determine whether to display the notification message transmitted through the second application.

3. The electronic device of claim 2, comprising:

at least one display, and wherein the first information indicates a state of the at least one display of the electronic device between a turn-off state of the at least one display and a turn-on state of the at least one display to be used by the external electronic device to determine whether to display the notification message.

4. The electronic device of claim 3, wherein the instructions, when executed by the at least one processor individually or collectively, cause the electronic device to:

in response to identifying, through the first application, the notification message generated by the second application, transmit, to the notification framework of the external electronic device through the first application, the first information.

5. The electronic device of claim 3, wherein the instructions, when executed by the at least one processor individually or collectively, cause the electronic device to:

identify a change of a state of the at least one display of the electronic device between the turn-off state of the at least one display and the turn-on state of the at least one display, in response to identifying the change of the state of the at least one display, transmit, to the notification framework of the external electronic device through the first application, the first information.

6. The electronic device of claim 3, wherein the instructions, when executed by the at least one processor individually or collectively, cause the electronic device to:

after transmitting, to the counterpart second application of the external electronic device through the second application of the electronic device by bypassing the first application, the notification message, receive, from the notification framework of the external electronic device through the first application, a request for the state of the at least one display of the electronic device, and in response to receiving the request, transmit, to the notification framework of the external electronic device through the first application, the first information.

7. The electronic device of claim 3, wherein the instructions, when executed by the at least one processor individually or collectively, cause the electronic device to:

identify a change of the state of the at least one display of the electronic device between the turn-off state of the at least one display and the turn-on state of the at least one display, in response to identifying the change of the state of the at least one display, transmit, to a data layer of the electronic device through the first application, the first information, transmit, to the data layer of the electronic device through the second application of the electronic device, the notification message generated by the second application, and transmit, to a counterpart data layer of the external electronic device, the first information and the notification message in a packet.

8. The electronic device of claim 1, wherein the instructions, when executed by the at least one processor individually or collectively, cause the electronic device to:

receive, from the notification framework of the external electronic device through the first application, second information indicating at least one application to be ceased transmitting a notification message to the notification framework of the external electronic device, based on the second information indicating that the second application corresponds to the at least one application, refrain from transmitting, to the notification framework of the external electronic device through the first application, the notification message generated by the second application, and based on the second information indicating that the second application does not correspond to the at least one application, transmit, to the notification framework of the external electronic device through the first application, the notification message generated by the second application.

9. A method of an electronic device including communication circuitry, the method comprising:

identifying, through a first application, a notification message generated by a second application being ceased transmitting the notification message to a notification framework of an external electronic device through the first application of the electronic device; and transmitting, to a counterpart second application of the external electronic device through the second application of the electronic device by bypassing the first application, the notification message, without transmitting, to the notification framework of the external electronic device through the first application, the notification message based on identifying, through the first application, the notification message generated by the second application.

10. The method of claim 9, further comprising:

transmitting, to the notification framework of the external electronic device through the first application, first information to be used by the external electronic device to determine whether to display the notification message to be transmitted through the second application.

11. The method of claim 10, wherein the first information indicates a state of at least one display of the electronic device between a turn-off state of the at least one display and a turn-on state of the at least one display to be used by the external electronic device to determine whether to display the notification message.

12. The method of claim 11, further comprising:

in response to identifying, through the first application, the notification message generated by the second application, transmitting, to the notification framework of the external electronic device through the first application, the first information.

13. The method of claim 11, further comprising:

identifying a change of a state of the at least one display of the electronic device between the turn-off state of the at least one display and the turn-on state of the at least one display, in response to identifying the change of the state of the at least one display, transmitting, to the notification framework of the external electronic device through the first application, the first information.

14. The method of claim 11, further comprising:

after transmitting, to the counterpart second application of the external electronic device through the second application of the electronic device by bypassing the first application, the notification message, receiving, from the notification framework of the external electronic device through the first application, a request for the state of the at least one display of the electronic device, and in response to receiving the request, transmitting, to the notification framework of the external electronic device through the first application, the first information.

15. The method of claim 11, further comprising:

identifying a change of the state of the at least one display of the electronic device between the turn-off state of the at least one display and the turn-on state of the at least one display, in response to identifying the change of the state of the at least one display, transmitting, to a data layer of the electronic device through the first application, the first information, transmitting, to the data layer of the electronic device through the second application of the electronic device, the notification message generated by the second application, and transmitting, to a counterpart data layer of the external electronic device, the first information and the notification message in a packet.

16. The method of claim 9, comprising:

receiving, from the notification framework of the external electronic device through the first application, second information indicating at least one application to be ceased transmitting a notification message to the notification framework of the external electronic device, based on the second information indicating that the second application corresponds to the at least one application, refraining from transmitting, to the notification framework of the external electronic device through the first application, the notification message generated by the second application, and based on the second information indicating that the second application does not correspond to the at least one application, transmitting, to the notification framework of the external electronic device through the first application, the notification message generated by the second application.

17. A method of an electronic device comprising:

receiving, from a counterpart second application of an external electronic device through a second application of the electronic device, a notification message without receiving, from a first application of the external electronic device through a notification framework of the electronic device, the notification message generated by the counterpart second application being ceased transmitting the notification message to the notification framework of the electronic device through the first application of the external electronic device; and receiving first information indicating a state of at least one display of the external electronic device between a turn-off state of the at least one display and a turn-on state of the at least one display;

in response to the state of the at least one display corresponding to the turn-off state, displaying the notification message; and in response to the state of the at least one display corresponding to the turn-on state, refraining from displaying the notification message.

18. The method of claim 17, further comprising:

in response to receiving the notification message, transmitting a request for the state of the at least one display of the external electronic device;

after transmitting the request, receiving the first information indicating the state of the at least one display of the external electronic device.

19. The method of claim 17, further comprising:

receiving, from the external electronic device, the first information and the notification message in a packet.

20. The method of claim 17, further comprising:

transmitting, to the first application through the notification framework of the electronic device, second information indicating at least one application to be ceased transmitting a notification message to the notification framework of the external electronic device to be used by the first application.

* * * * *